United States Patent
Wu et al.

(10) Patent No.: US 11,954,579 B2
(45) Date of Patent: Apr. 9, 2024

(54) SYNAPTIC WEIGHT TRAINING METHOD, TARGET IDENTIFICATION METHOD, ELECTRONIC DEVICE AND MEDIUM

(71) Applicant: LYNXI TECHNOLOGIES CO., LTD., Beijing (CN)

(72) Inventors: Zhenzhi Wu, Beijing (CN); Xin Ma, Beijing (CN); Qune Kong, Beijing (CN); Yaolong Zhu, Beijing (CN)

(73) Assignee: LYNXI TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 18/265,715

(22) PCT Filed: May 31, 2022

(86) PCT No.: PCT/CN2022/096281
§ 371 (c)(1),
(2) Date: Jun. 7, 2023

(87) PCT Pub. No.: WO2022/253229
PCT Pub. Date: Dec. 8, 2022

(65) Prior Publication Data
US 2023/0394288 A1    Dec. 7, 2023

(30) Foreign Application Priority Data

Jun. 4, 2021 (CN) .................. 202110624089.9
Jun. 4, 2021 (CN) .................. 202110625816.3
Jun. 4, 2021 (CN) .................. 202110625880.1

(51) Int. Cl.
*G06N 3/049* (2023.01)
*G06N 3/084* (2023.01)

(52) U.S. Cl.
CPC .............. *G06N 3/049* (2013.01); *G06N 3/084* (2013.01)

(58) Field of Classification Search
CPC .............................. G06N 3/049; G06N 3/084
See application file for complete search history.

(56) References Cited

U.S. PATENT DOCUMENTS

| | | | |
|---|---|---|---|
| 2017/0185890 A1 | 6/2017 | Yasuda et al. | |
| 2020/0218963 A1 | 7/2020 | Yasuda et al. | |
| 2022/0036095 A1* | 2/2022 | Kugele | B60W 30/18109 |

FOREIGN PATENT DOCUMENTS

| | | |
|---|---|---|
| CN | 102831476 A | 12/2012 |
| CN | 109829422 A | 5/2019 |

(Continued)

OTHER PUBLICATIONS

Furuya et al. "Semi-supervised learning combining backpropagation and STDP: STDP enhances learning by backpropagation with a small amount of labeled data in a spiking neural network", J. Physical Society of Japan, May 19, 2021, pp. 9.*

(Continued)

*Primary Examiner* — Li Wu Chang
(74) *Attorney, Agent, or Firm* — Li & Cai Intellectual Property (USA) Office

(57) ABSTRACT

The present disclosure relates to a synaptic weight training method, a target identification method, an electronic device and a storage medium. The synaptic weight training method includes: inputting spike signals corresponding to training samples into a spiking neural network to be trained; learning a target synaptic weight in the spiking neural network with a back propagation rule to obtain a first branch weight; and learning the target synaptic weight with a synaptic plasticity rule to obtain a second branch weight; and updating the target synaptic weight according to the first branch weight and the second branch weight.

19 Claims, 11 Drawing Sheets

(56) References Cited

FOREIGN PATENT DOCUMENTS

| | | | |
|---|---|---|---|
| CN | 110210563 A | 9/2019 | |
| CN | 110826602 A | 2/2020 | |
| CN | 112085198 A | 12/2020 | |
| CN | 112529176 A | 3/2021 | |
| CN | 112734012 A | 4/2021 | |
| CN | 113269113 A | 8/2021 | |
| CN | 113269264 A | 8/2021 | |
| CN | 113269313 A | 8/2021 | |
| CN | 113537455 A | 10/2021 | |
| WO | WO-2015016640 A1 * | 2/2015 | ........... G06F 3/0604 |

OTHER PUBLICATIONS

Ahn, "Neural Network Computing Device, System and Method", WO Doc, 2015, pp. 53.*
WIPO, International Search Report dated Aug. 29, 2022.
Wu, Yujie et al.: "Spatio-temporal backpropagation for training high-performance spiking neural networks", Frontiers In Neuroscience, May 23, 2018.
Zhang, Malu et al.: "Spike-timing-dependent back propagation in deep spiking neural networks", arxiv, Mar. 26, 2020.
China Patent Office, First Office Action dated Nov. 29, 2023 for application No. CN202110624089.9.
China Patent Office, First Office Action dated Nov. 24, 2023 for application No. CN202110625816.3.
China Patent Office, First Office Action dated Oct. 12, 2023 for application No. CN202110625880.1.

* cited by examiner

S2
Obtain the first branch weight from a forward output result and a back propagation error — S201
FIG.3
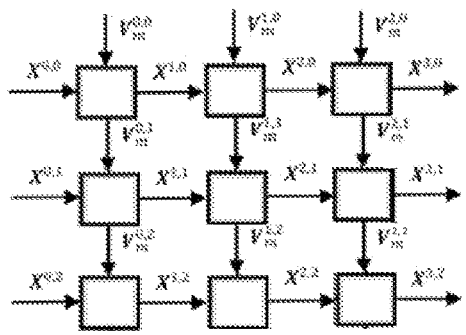
FIG. 4a
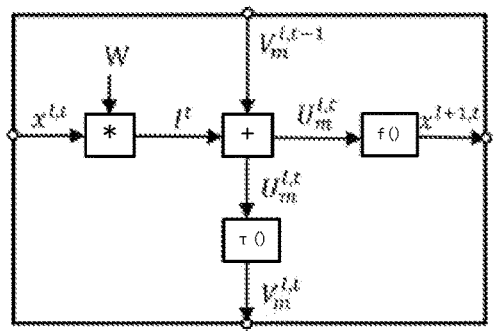
FIG. 4b
S3
Learn the target synaptic weight with an LTP sub-rule under the synaptic plasticity rule to obtain the second branch weight — S301
FIG. 5

SYNAPTIC WEIGHT TRAINING METHOD, TARGET IDENTIFICATION METHOD, ELECTRONIC DEVICE AND MEDIUM

CROSS-REFERENCE TO RELATED APPLICATIONS

The present application is a National Phase Application filed under 35 U.S.C. 371 as a national stage of PCT/CN2022/096281, filed on May 31, 2022, an application claiming priority from Chinese Patent Application No. 202110625816.3, filed on Jun. 4, 2021 in the Chinese Intellectual Property Office, Chinese Patent Application No. 202110624089.9, filed on Jun. 4, 2021 in the Chinese Intellectual Property Office, and Chinese Patent Application No. 202110625880.1, filed on Jun. 4, 2021 in the Chinese Intellectual Property Office, contents of which are hereby incorporated herein by reference in their entirety.

TECHNICAL FIELD

Embodiments of the present disclosure relate to the technical field of artificial intelligence, and particularly relate to a synaptic weight training method, a target identification method, an electronic device and a computer-readable storage medium.

BACKGROUND

The spiking neural network (SNN), with a bionic design fitting the reality, can be trained in a back propagation training method or a bionic training method, and a trained spiking neural network can be applied to the fields of image processing, computer vision and the like.

SUMMARY

Embodiments of the present disclosure provide a synaptic weight training method, a target identification method, an electronic device and a computer-readable storage medium, which can train and update synaptic weights quickly with less resource occupation while ensuring the validity of the weight training result, thereby improving the training efficiency of synaptic weights, and can implement rapid target identification based on a trained spiking neural network, thereby improving the identification speed, and ensuring the identification accuracy.

In a first aspect, an embodiment of the present disclosure provides a synaptic weight training method, including: inputting spike signals corresponding to training samples into a spiking neural network to be trained; learning a target synaptic weight in the spiking neural network with a back propagation rule to obtain a first branch weight; learning the target synaptic weight with a synaptic plasticity rule to obtain a second branch weight; and updating the target synaptic weight according to the first branch weight and the second branch weight.

In a second aspect, an embodiment of the present disclosure further provides a target identification method, including: acquiring at least one image to be identified including a target object; performing spike coding on the at least one image to be identified to generate an image spike sequence; inputting the image spike sequence into a preset spiking neural network, and performing target identification on the at least one image to be identified with the spiking neural network, where the spiking neural network is obtained by training with the synaptic weight training method according to any embodiment of the present disclosure.

In some embodiments, the target object includes a human body, the image to be identified includes key point information, including at least one key point, a plurality of key points are used for characterizing skeleton features of the human body in the image to be identified, and the image spike sequence includes a key point spike sequence; and performing spike coding on the at least one image to be identified to generate the image spike sequence includes: performing spike coding on the key point information to generate the key point spike sequence.

In some embodiments, inputting the image spike sequence into the preset spiking neural network, and performing target identification on the at least one image to be identified with the spiking neural network includes: inputting the key point spike sequence into the preset spiking neural network, and performing human behavior identification on the image sequence to be identified with the spiking neural network.

In a third aspect, an embodiment of the present disclosure further provides a human behavior identification method, including: acquiring key point information corresponding to an image sequence to be identified, where a single image to be identified in the image sequence to be identified corresponds to a plurality of key points, the plurality of key points are used for characterizing skeleton features of a human body in the image to be identified, and the key point information includes all the acquired key points; performing spike coding on the key point information to generate a key point spike sequence; inputting the key point spike sequence into the preset spiking neural network, and performing human behavior identification on the image sequence to be identified with the spiking neural network, where the spiking neural network is obtained by training with key point spike sequence samples based on a predetermined algorithm in advance.

In a fourth aspect, an embodiment of the present disclosure further provides an electronic device, including a memory, a processor, and a computer program stored in the memory and executable on the processor, where the processor, when executing the computer program, implements the synaptic weight training method or target identification method according to any embodiment of the present disclosure.

In a fifth aspect, an embodiment of the present disclosure provides a computer-readable storage medium storing a computer program thereon which, when executed by a processor, causes the synaptic weight training method or target identification method according to any embodiment of the present disclosure to be implemented.

It will be appreciated that the foregoing general description and the following detailed description are merely exemplary and explanatory, and are not intended to limit the present disclosure. Further features and aspects of the present disclosure will become apparent from the following detailed description of exemplary embodiments with reference to the attached drawings.

BRIEF DESCRIPTION OF DRAWINGS

FIG. 3 is a flowchart of a method for acquiring a first branch weight according to an embodiment of the present disclosure;

FIG. 4a is a schematic structural diagram of a spiking neural network model according to an embodiment of the present disclosure;

FIG. 4b is a schematic structural diagram of a neuron node according to an embodiment of the present disclosure;

FIG. 5 is a flowchart of a method for acquiring a second branch weight according to an embodiment of the present disclosure;

DETAIL DESCRIPTION OF EMBODIMENTS

Figure 1:
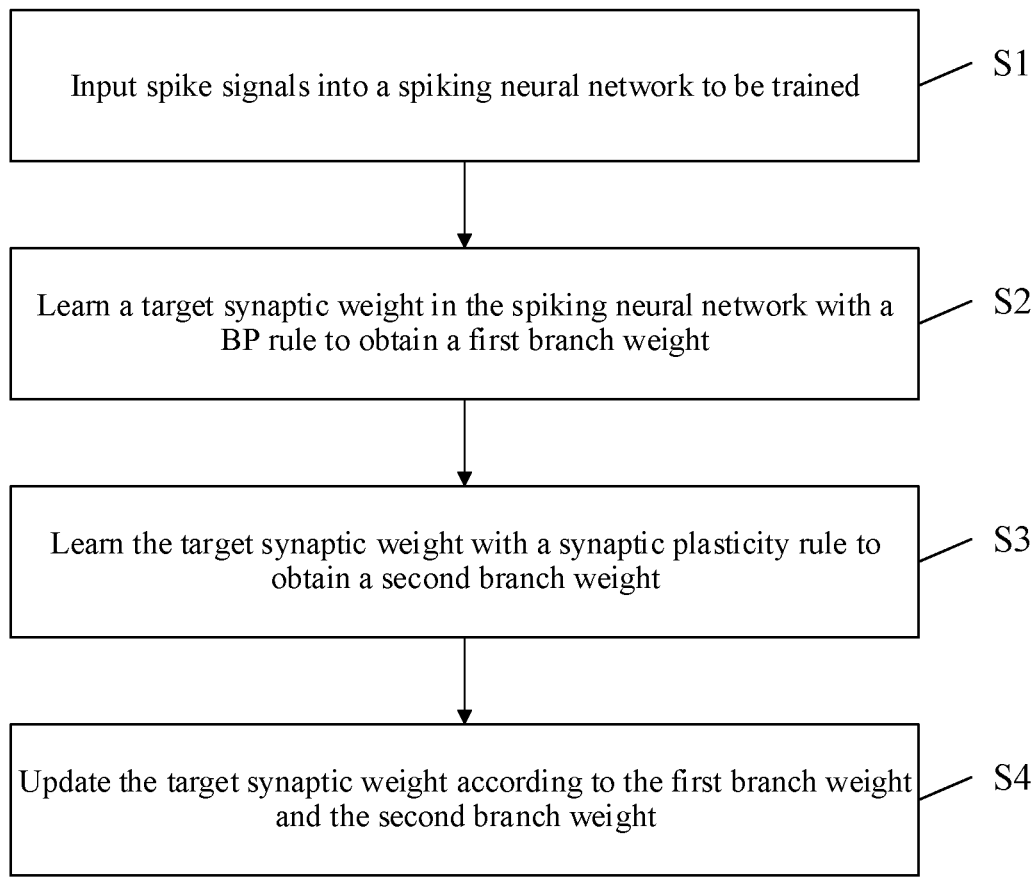
FIG. 1 is a flowchart of a synaptic weight training method according to an embodiment of the present disclosure.

The present disclosure will now be further described in detail below in conjunction with the drawings and exemplary embodiments. It will be appreciated that the embodiments described herein are used merely for the purpose of explaining the present disclosure instead of limiting the present disclosure. It should be further noted that, for the convenience of description, merely some of the structures associated with the present disclosure, not all the structures, are shown in the drawings.

In a first aspect, an embodiment of the present disclosure provides a synaptic weight training method used for obtaining synaptic weights of a spiking neural network by training.

FIG. 1 is a flowchart of a synaptic weight training method according to an embodiment of the present disclosure. As shown in FIG. 1, the method includes the following operations S1 to S4.

At operation S1, inputting spike signals into a spiking neural network to be trained.

The spike signals, i.e., training samples, may be spike sequences or spike signals corresponding to a specific coding form.

In some embodiments, a neuron model of the spiking neural network employs a Leaky Integrate-and-Fire (LIF) model.

In some embodiments, before inputting the spike signals into the spiking neural network to be trained, the method further includes: initializing various parameters, including synaptic weights, activation thresholds, and the like, of the spiking neural network.

At operation S2, learning a target synaptic weight in the spiking neural network with a back propagation (BP) rule to obtain a first branch weight.

In operation S2, the target synaptic weight is updated with the back propagation rule, where the first branch weight is an updated result corresponding to the back propagation rule. When training is carried out based on the back propagation rule, the training effect is good, but a great amount of computation is involved in the training, and a large number of marked samples are desired.

At operation S3, learning the target synaptic weight with a synaptic plasticity rule to obtain a second branch weight.

In operation S3, the target synaptic weight is updated with the synaptic plasticity rule, and the second branch weight is an updated result corresponding to the synaptic plasticity rule. The synaptic plasticity rule may adopt a bionic training rule such as a spike timing dependent plasticity (STDP) rule and a Hebb learning rule. In some embodiments, the STDP rule includes a long term plasticity (LT) sub-rule, a short term plasticity (STP) sub-rule, a homeostasis sub-rule, and the like. The synaptic plasticity rule is an unsupervised learning method, which adopts a local updating mechanism, involves a small amount of training, and does not need marked samples, but has a limited training effect.

In some embodiments, operation S2 of learning with the back propagation rule and operation S3 of learning with the synaptic plasticity rule may be performed sequentially or in parallel.

At operation S4, updating the target synaptic weight according to the first branch weight and the second branch weight.

In some embodiments, each branch weight is subjected to verification and assessment with verification samples to determine an updated value of the target synaptic weight. Alternatively, in some embodiments, the first branch weight and the second branch weight are input into a preset fusion update formula for calculation to obtain the updated value of the target synaptic weight, and the fusion update formula may be designed based on various integration manners such as averaging, summing, weighted averaging and weighted summing.

The embodiment of the present disclosure provides a synaptic weight training method which may be configured to obtain a first branch weight by training with a back propagation rule, obtain a second branch weight by training with a synaptic plasticity rule, update a target synaptic weight according to the first branch weight and the second branch weight, and train the target synaptic weight by utilizing the advantages of the back propagation rule and the synaptic plasticity rule, respectively. Therefore, the synaptic weights can be trained and updated quickly with less resource occupation while ensuring the validity of the weight training result, thereby improving the training efficiency of synaptic weights.

Figure 2A:
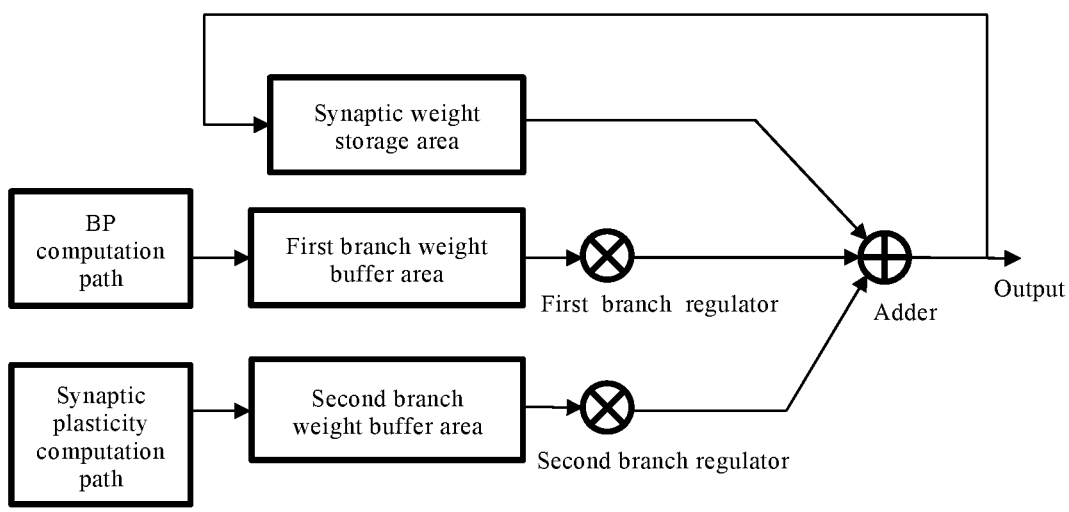
FIG. 2a is a schematic structural diagram of a synaptic weight training system according to an embodiment of the present disclosure.

FIG. 2a is a schematic structural diagram of a synaptic weight training system according to an embodiment of the present disclosure. As shown in FIG. 2a, the synaptic weight training system includes: a first branch weight buffer area connected to a back propagation computation path, a second branch weight buffer area connected to a synaptic plasticity computation path, a first branch regulator, a second branch regulator and a first-level adder of a synaptic weight storage area. The first branch regulator is connected to the first branch weight buffer area, and the second branch regulator is connected to the second branch weight buffer area.

Figure 2B:
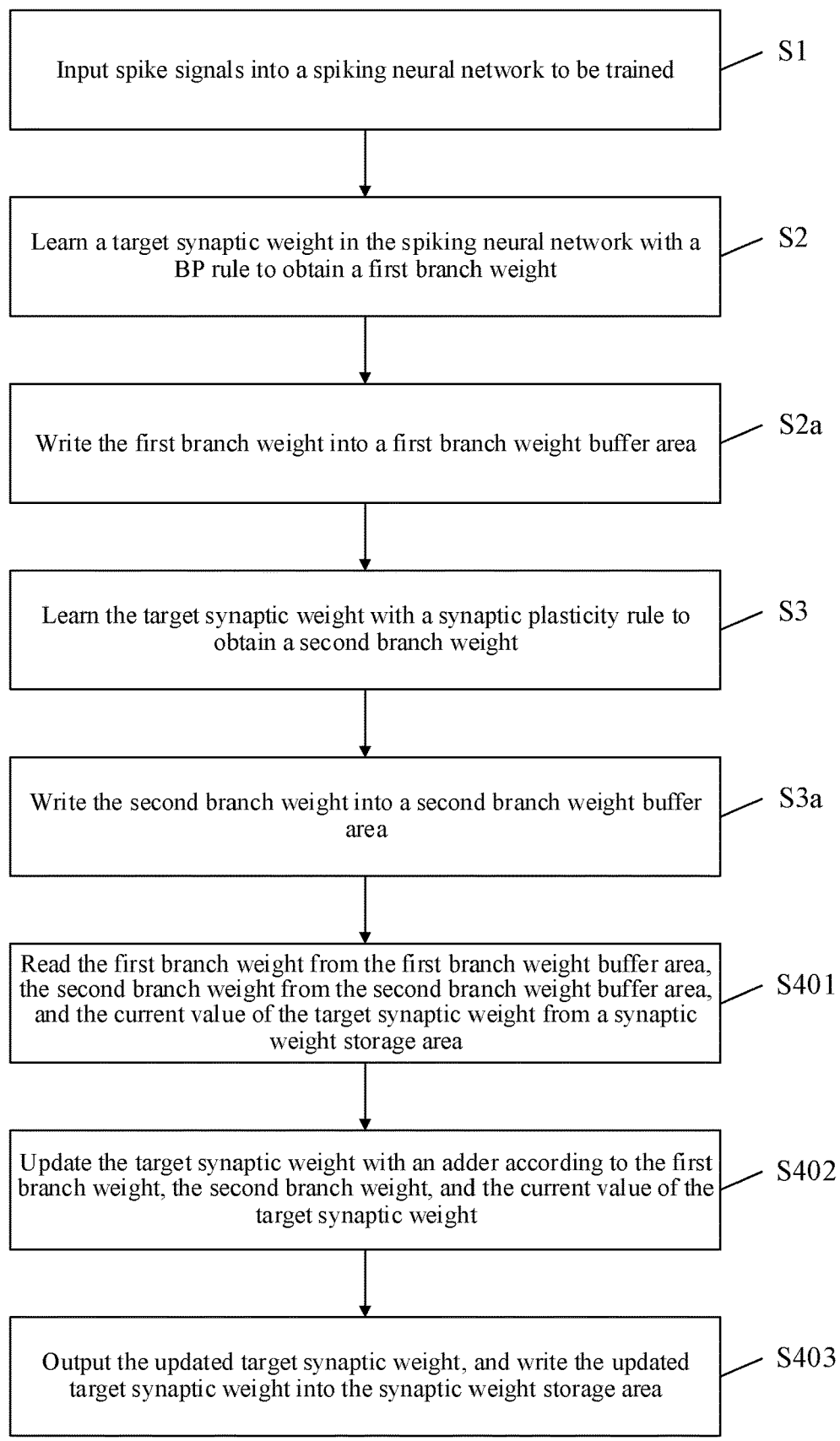
FIG. 2b is a flowchart of a synaptic weight training method according to an embodiment of the present disclosure.

FIG. 2b is a flowchart of a synaptic weight training method according to an embodiment of the present disclosure. As shown in FIG. 2b, this method is an optional implementation based on the method shown in FIG. 1. Exemplarily, based on the synaptic weight training system shown in FIG. 2a, the method includes not only operations S1 to S3, but also S401 to S403, as well as operation S2a after S2 and operation S3a after S3. Operations S401 to S403 form an exemplary optional implementation of operation S4. The following describes merely operations S2a, S3a, and S401 to S403 in detail.

In operation S2, after learning the target synaptic weight in the spiking neural network with the back propagation rule to obtain the first branch weight, the method further includes operation S2a.

At operation S2a, writing the first branch weight into a first branch weight buffer area.

In operation S3 after learning the target synaptic weight with the synaptic plasticity rule to obtain the second branch weight, the method further includes operation S3a.

At operation S3a, writing the second branch weight into a second branch weight buffer area.

On the basis of the above operations S2a and S3a, operation S4 of updating the target synaptic weight according to the first branch weight and the second branch weight includes operations S401 to S403.

At operation S401, reading the first branch weight from the first branch weight buffer area, the second branch weight from the second branch weight buffer area, and the current value of the target synaptic weight from a synaptic weight storage area.

In some embodiments, operation S401 includes: reading, in response to a condition that the first branch weight buffer area and the second branch weight buffer area each have unread branch weights stored therein, the first branch weight from the first branch weight buffer area, the second branch weight from the second branch weight buffer area, and the current value of the target synaptic weight from the synaptic weight storage area.

At operation S402, updating the target synaptic weight with an adder according to the first branch weight, the second branch weight, and the current value of the target synaptic weight.

At operation S403, outputting the updated target synaptic weight, and writing the updated target synaptic weight into the synaptic weight storage area.

Therefore, updating of the target synaptic weight is completed once based on the corresponding synaptic weight training system.

FIG. 3 is a flowchart of a method for acquiring a first branch weight according to an embodiment of the present disclosure, which is intended to further describe an implementation of operation S2. As shown in FIG. 3, exemplarily, the back propagation rule is a back propagation through time (BPTT) rule. Operation S2 of learning a target synaptic weight in the spiking neural network with a back propagation rule to obtain the first branch weight includes operation S201.

At operation S201, obtaining the first branch weight from a forward output result and a back propagation error.

In operation S201, the first branch weight is calculated from an output result from a forward layer of the current layer in a forward propagation phase and a back propagation error corresponding to the current layer in a back propagation phase. The back propagation through time rule is actually a back propagation rule designed for a case where the input data is time series data. The forward output result is calculated and output by a corresponding neuron node in the forward layer based on a node function of the neuron node. The back propagation error is calculated from a loss function, an actual calculated output, and an expected output.

FIG. 4a is a schematic structural diagram of a spiking neural network model according to an embodiment of the present disclosure. As shown in FIG. 4a, a neuron model of the spiking neural network employs an LIF model; the spiking neural network is a recurrent network, and the structural diagram is a two-dimensional space-time diagram obtained by expanding the spiking neural network model in a time domain. The longitudinal arrows represent progression of the time step in respective layers of the spiking neural network, and the transverse arrows represent transmission directions of data in a plurality of layers to which the neural nodes belong and connected to each other end-to-end. Each neural node corresponds to a node function which is obtained from integration of a membrane potential and an activation function, and explanation of the symbols may refer to FIG. 4b.

FIG. 4b is a schematic structural diagram of a neuron node according to an embodiment of the present disclosure. As shown in FIG. 4b, the neuron node is a neuron node in the spiking neural network model shown in FIG. 4a.

For this neuron node, first, for input data, a formula $$I^t = X^{l,t} * W$$

is adopted to carry out synaptic integration and obtain an integrated additional value $I^t$, where l represents a layer identifier; t is a current time step; $X^{l,t}$ represents an activation value corresponding to a neuron node in layer 1 in the time step t; and W represents the corresponding synaptic weight. The synaptic integration process may be implemented by convolution or full connection or the like.

Further, a formula $$U_m^{l,t} = I^t + V_m^{l,t-1}$$

is adopted to calculate a current membrane potential $U_m^{l,t}$ corresponding to the neuron node, where $V_m^{l,t-1}$ represents the membrane potential corresponding to a previous time step, i.e., the relative resting potential.

In some embodiments, for output data, the result is calculated from an analogue activation function f( ) and a corresponding activation value $X^{l,t+1}$ at the time of output. In some embodiments, the analogue activation function f( ) corresponds to $f(x)=S(x-V_{th})$, where S( ) is a step function, or a Heaviside function.

Furthermore, for the interior of a node, a node function NF( ) corresponding to the neuron node may be described by:

$$(V_m^{l,t}, X^{l+1,t}) = NF(V_m^{l,t-1}, X^{l,t})$$

where $V_m^{l,t}$ represents a corresponding membrane potential of the neuron node after a response spike is fired.

Further, a relationship function $\tau( )$ between a corresponding membrane potential after a spike is fired, $V_m^{l,t}$, and a current corresponding membrane potential corresponding to the neuron node, $U_m^{l,t}$, may be described by:

$$V_m^{l,t} = \tau(U_m^{l,t}) = \alpha \cdot S(U_m^{l,t-1} - V_{th}) \cdot V_{reset} + \alpha \cdot [1 - S(U_m^{l,t} - V_{th})] \cdot U_m^{l,t} + \beta$$

where $V_{th}$ represents a reset threshold, $V_{reset}$ represents a reset potential, where if the current membrane potential is greater than or equal to the reset threshold, the neuron node fires a spike, and resets the membrane potential to the reset potential; and $\alpha$ is a multiplicative attenuation coefficient, and $\beta$ is an additive attenuation coefficient.

Further, regarding the back propagation rule, it can be obtained from the above that when the synaptic weight is calculated according to the back propagation through time rule, according to the chain rule, the related relationship function $\tau( )$ may, when calculating a partial derivative of $V_m^{l,t}$ regarding $U_m^{l,t}$ derive that:

$$\frac{\partial V_m^{l,t}}{U_m^{l,t}} = \alpha \cdot \delta(U_m^{l,t} - V_{th}) \cdot (V_{reset} - U_m^{l,t}) + \alpha \cdot [1 - S(U_m^{l,t} - V_{th})]$$

where $\delta( )$ is a Dirac $\delta$ function with function values all equal to zero at points other than zero, and an integral over the entire domain equal to 1. Since the function is not friendly in back propagation, a rectangular window is introduced for the function. Taking the function $\delta(x)$ as an example, the rectangular window $\bar{\delta}(x)$ of the function is:

$$\bar{\delta}(x) = \begin{cases} 1, & |x| < \mu \\ 0, & \text{otherwise} \end{cases}$$

where $\mu$ is a positive number.

It should be noted that the above description of the operation of obtaining the first branch weight from the forward output result and the back propagation error, and the corresponding spiking neural network model and neuron node is merely an exemplary implementation provided in the embodiment of the present disclosure, and does not limit the technical solution of the present disclosure. Other calculation methods of obtaining the first branch weight according to corresponding parameters and corresponding neural network models are also applicable to the technical solution of the present disclosure.

FIG. 5 is a flowchart of a method for acquiring a second branch weight according to an embodiment of the present disclosure, which is intended to further describe an implementation of operation S3. As shown in FIG. 5, exemplarily, operation S3 of learning the target synaptic weight with a synaptic plasticity rule to obtain the second branch weight includes operation S301.

At operation S301, learning the target synaptic weight with a long term plasticity (LT) sub-rule under the synaptic plasticity rule to obtain the second branch weight.

The synaptic plasticity rule adopts a spike timing dependent plasticity rule, and therefore, modeling learning of the target synaptic weight is performed based on the long term plasticity sub-rule.

Figure 6:
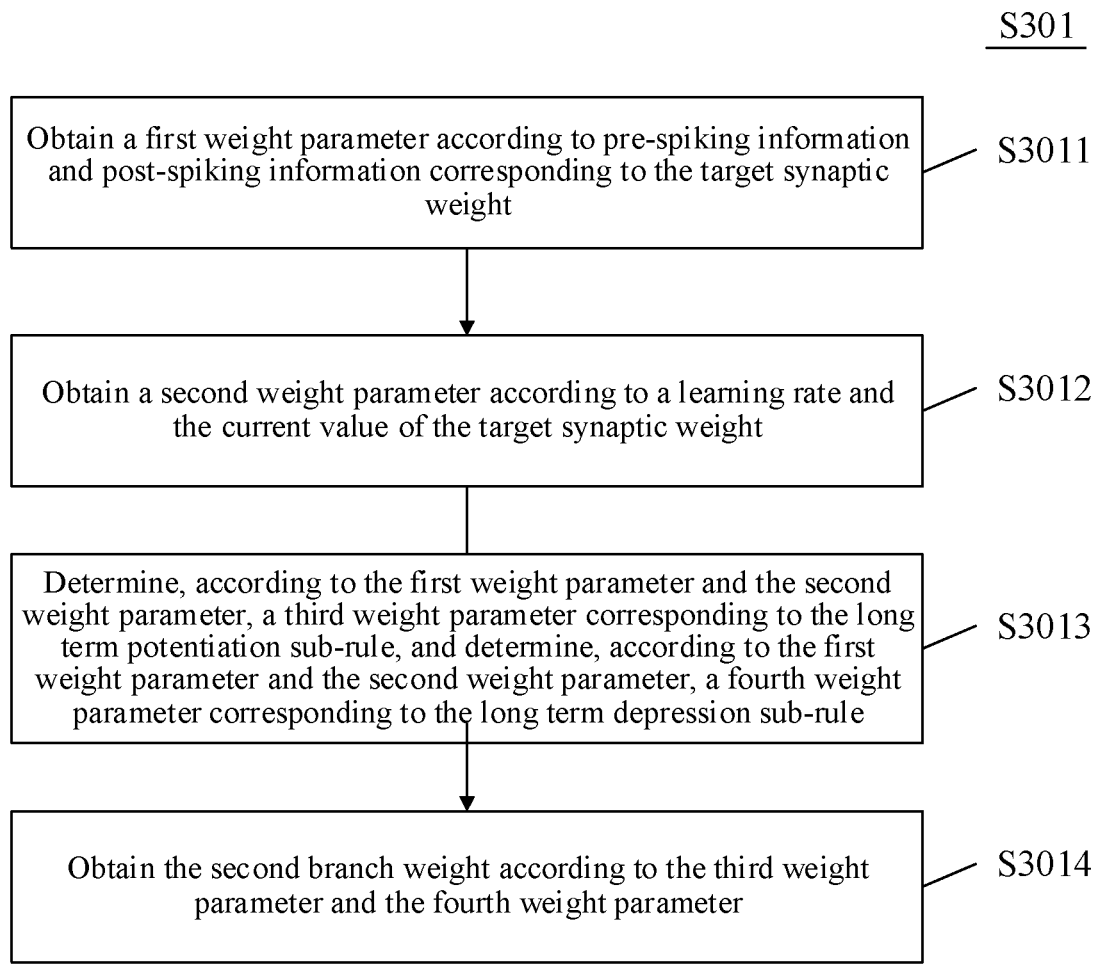
FIG. 6 is a flowchart of a method for acquiring a second branch weight according to an embodiment of the present disclosure.

FIG. 6 is a flowchart of a method for acquiring a second branch weight according to an embodiment of the present disclosure, which is intended to further describe an implementation of operation S301. As shown in FIG. 6, exemplarily, the long term plasticity sub-rule includes a long term depression (LTD) sub-rule and a long term potentiation (LTP) sub-rule. Operation S301 of learning the target synaptic weight with the long term plasticity sub-rule under the synaptic plasticity rule to obtain the second branch weight includes operations S3011 to S3014.

At operation S3011, obtaining a first weight parameter according to pre-spiking information and post-spiking information corresponding to the target synaptic weight.

Considering the interaction of neurons before and after a synapse, the first weight parameter is calculated from pre-spiking information and post-spiking information.

In some embodiments, based on the Hebbian (HB) theory, a previous activity and a previous value of a single neuron node are tracked via a local variable trace. The previous activity is embodied in membrane potential changes and spiking of the neuron node in a last time step, and the previous value is embodied in the trace value in the last time step, where $x_i(t)$ is used to represent the trace related to a neuron i before the synapse, and $y_j(t)$ is used to represent the trace related to a neuron j after the synapse. Thus, a formula $$\begin{cases} HB_+(t) = x_i(t) * s_j(t) \\ HB_-(t) = y_j(t) * s_i(t) \end{cases}$$

is adopted to calculate the first weight parameter $HB_+(t)$, where t is a time variable; $s_i(t)$ and $s_j(t)$ represent pre-spiking information and post-spiking information, respectively.

At operation S3012, obtaining a second weight parameter according to a learning rate and the current value of the target synaptic weight.

Considering that the target synaptic weight itself performs iterative update, the second weight parameter is calculated from the learning rate and the current value of the target synaptic weight.

In some embodiments, based on the additive theory, a formula $$\begin{cases} WB_+(t) = \lambda \\ WB_-(t) = -\lambda \eta \end{cases}$$

is adopted to calculate the second weight parameter $WB_+(t)$, where $\lambda$ is the learning rate, and $\eta$ represents a proportionality coefficient between the long term depression sub-rule and the long term potentiation sub-rule.

At operation S3013, determining, according to the first weight parameter and the second weight parameter, a third weight parameter corresponding to the long term potentiation sub-rule, and determining, according to the first weight parameter and the second weight parameter, a fourth weight parameter corresponding to the long term depression sub-rule.

In operation S3013, the third weight parameter corresponding to the long term potentiation sub-rule and the fourth weight parameter corresponding to the long term depression sub-rule are obtained through the first weight parameter obtained from pre-spiking information and post-spiking information, and the second weight parameter obtained from the learning rate and the current value of the target synaptic weight.

In some embodiments, a formula $$w'(t)=HB_+(t)*WB_+(t)$$

is adopted to calculate the third weight parameter w'(t). Further, a formula $$w''(t)=HB_-(t)*WB_-(t)$$

is adopted to calculate the fourth weight parameter w''(t).

At operation S3014, obtaining the second branch weight according to the third weight parameter and the fourth weight parameter.

The second branch weight is calculated from the third weight parameter corresponding to the long term potentiation sub-rule and the fourth weight parameter corresponding to the long term depression sub-rule.

In some embodiments, a formula $$w(t)=w(t-\Delta t)+w'(t)+w''(t)$$

is adopted to calculate the second branch weight w(t), where Δt represents the time step.

It should be noted that the above description of calculating the corresponding weight parameters and weights with the formulas is merely an exemplary implementation provided in the embodiment of the present disclosure, and does not limit the technical solution of the present disclosure. Other calculation methods of obtaining the weights and weight parameters according to corresponding parameters are also applicable to the technical solution of the present disclosure.

Figure 7:
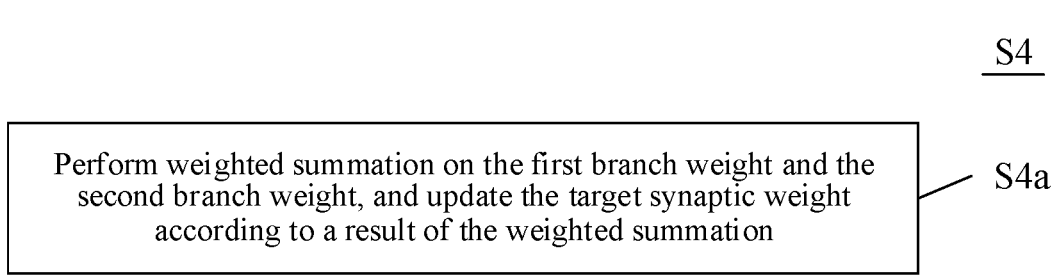
FIG. 7 is a flowchart of a synaptic weight updating method according to an embodiment of the present disclosure.

FIG. 7 is a flowchart of a synaptic weight updating method according to an embodiment of the present disclosure, which is intended to further describe an implementation of operation S4. As shown in FIG. 7, operation S4 of updating the target synaptic weight according to the first branch weight and the second branch weight includes operation S4a.

At operation S4a, performing weighted summation on the first branch weight and the second branch weight, and updating the target synaptic weight according to a result of the weighted summation.

In operation S4a, the first branch weight and the second branch weight are integrated through weighted summation, so as to implement fusion update of the target synaptic weight.

In some embodiments, in the weighted summation, the first branch weight corresponds to a first weighting coefficient, and the second branch weight corresponds to a second weighting coefficient. The first weighting coefficient and the second weighting coefficient are both greater than or equal to 0 and less than or equal to 1, and a sum of the first weighting coefficient and the second weighting coefficient is 1.

In some embodiments, based on the system shown in FIG. 2a and in combination with operation S401, operation S4a of performing weighted summation on the first branch weight and the second branch weight, and updating the target synaptic weight according to the result of the weighted summation includes: acquiring an output first branch weight after being weighted by a first branch regulator, and acquiring an output second branch weight after being weighted by a second branch regulator; and inputting the weighted first branch weight, the weighted second branch weight and the current value of the target synaptic weight into an adder, and updating the target synaptic weight according to an output result of the adder.

Figure 8:
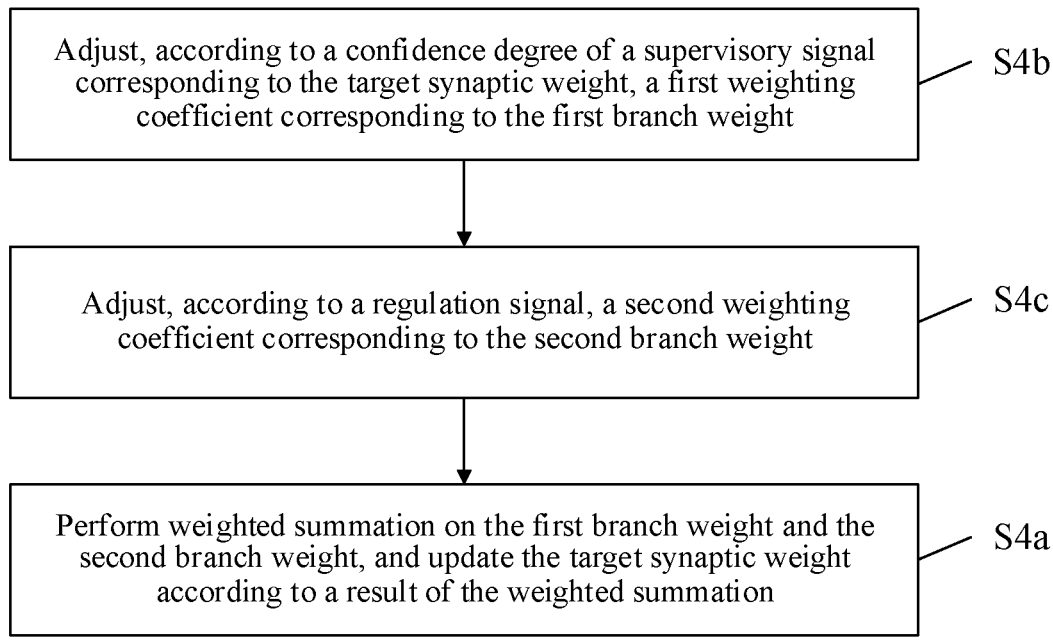
FIG. 8 is a flowchart of a synaptic weight updating method according to an embodiment of the present disclosure.

FIG. 8 is a flowchart of a synaptic weight updating method according to an embodiment of the present disclosure, which is intended to further describe an implementation of operation S4. As shown in FIG. 8, based on operation S4a shown in FIG. 7, operation S4 of updating the target synaptic weight according to the first branch weight and the second branch weight further includes operations S4b and S4c.

At operation S4b, adjusting, according to a confidence degree of a supervisory signal corresponding to the target synaptic weight, a first weighting coefficient corresponding to the first branch weight.

In some embodiments, when the corresponding supervisory signal has a relatively high confidence degree, the first weighting coefficient is increased or remains unchanged; and when the corresponding supervisory signal has a relatively low confidence degree, the first weighting coefficient is reduced.

In some embodiments, based on the system shown in FIG. 2a, operation S4b may be embodied by controlling the first branch regulator to adjust, according to a confidence degree of a supervisory signal corresponding to the target synaptic weight, the first weighting coefficient corresponding to the first branch weight.

At operation S4c, adjusting, according to a regulation signal, a second weighting coefficient corresponding to the second branch weight.

The regulation signal is determined based on spiking information, or firing information, of a layer in the spiking neural network, and in some embodiments, the spiking information is a spike sequence fired from the layer. In some embodiments, when a layer fires too much or too little, the second weighting coefficient may be reduced based on the regulation signal.

In some embodiments, based on the system shown in FIG. 2a, operation S4c may be embodied by controlling the second branch regulator to adjust, according to a regulation signal, the second weighting coefficient corresponding to the second branch weight.

It should be noted that the implementation of the combination of operations S4b and S4c in FIG. 8 is merely an exemplary implementation provided in the embodiment of the present disclosure. In other words, when the learning with the back propagation rule is emphasized, merely the adjustment corresponding to operation S4b may be implemented, and accordingly, when the learning with the synaptic plasticity rule is emphasized, merely the adjustment corresponding to operation S4c may be implemented.

In some optional embodiments, the sum of the first weighting coefficient and the second weighting coefficient may be controlled to be 1 when operations S4b and/or S4c are performed.

Exemplarily, when operations S4b and S4c are performed, the first weighting coefficient determined according to the confidence degree of the supervisory signal and the second weighting coefficient determined according to the regulation signal may be respectively determined and normalized, to obtain the adjusted first weighting coefficient and second weighting coefficient.

Exemplarily, when operation S4b or S4c, for example, merely operation S4b, is performed, the first weighting coefficient is increased according to the confidence degree of the supervisory signal, and the second weighting coefficient is correspondingly reduced, so that the sum of the first weighting coefficient and the second weighting coefficient is 1.

The embodiment of the present disclosure provides a synaptic weight training method which may be configured to obtain a first branch weight by training with a back propagation rule, obtain a second branch weight by training with a synaptic plasticity rule, update a target synaptic weight according to the first branch weight and the second branch weight, and train the target synaptic weight by utilizing the advantages of the back propagation rule and the synaptic plasticity rule, respectively. Therefore, the synaptic weights can be trained and updated quickly with less resource occupation while ensuring the validity of the weight training result, thereby improving the training efficiency of synaptic weights.

In a second aspect, an embodiment of the present disclosure further provides a target identification method configured to implement target identification with a trained spiking neural network.

Figure 9:
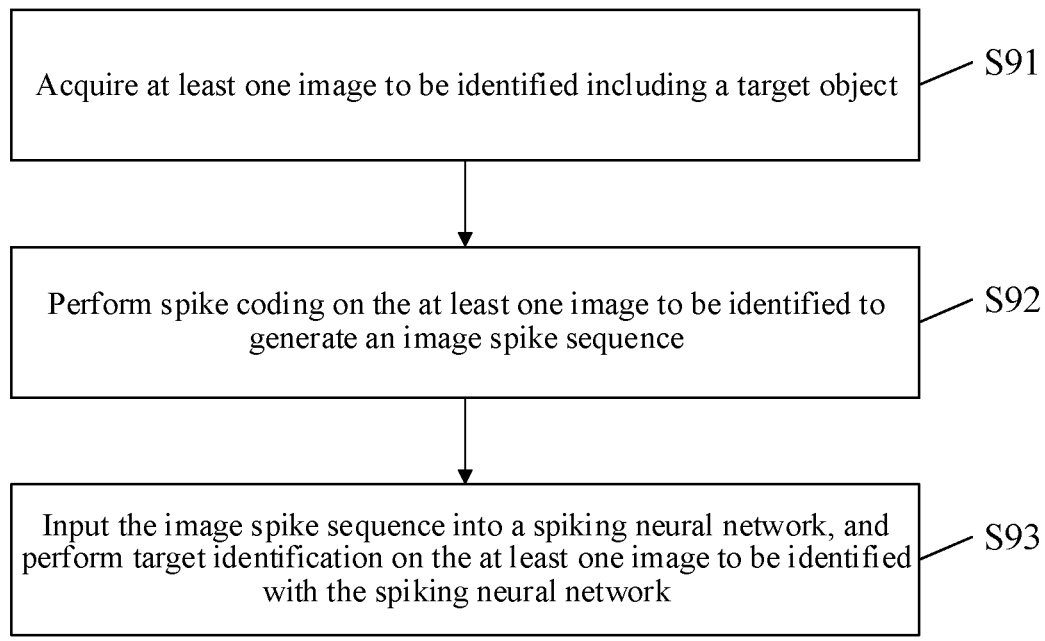
FIG. 9 is a flowchart of a target identification method according to an embodiment of the present disclosure.

FIG. 9 is a flowchart of a target identification method according to an embodiment of the present disclosure. As shown in FIG. 9, the method includes the following operations S91 to S93.

At operation S91, acquiring at least one image to be identified including a target object.

In operation S91, at least one image to be identified, including a target object to be identified, is acquired.

At operation S92, performing spike coding on the at least one image to be identified to generate an image spike sequence.

In some embodiments, the spiking coding may be implemented by constructing a relationship between a trigger rate of the spike sequence and a pixel intensity of the image; or by generating a matrix, in particular, a mask matrix or the like, based on an original color image or a gray scale image; or by performing spike coding on image gray scale information, color information, texture information, and other feature information, respectively. In some embodiments, the image spike sequence follows Poisson distribution.

In some embodiments, the image to be identified may be an image about a human body, the target image to be identified may include a human body, and the target identification may refer to human behavior identification. Based on such application scenarios, the image to be identified may include key point information, which may include at least one key point, and a plurality of key points may be used for characterizing skeleton features of the human body in the image to be identified, and the image spike sequence generated by performing spike coding on the image to be identified may include a key point spike sequence.

Exemplarily, performing spike coding on the at least one image to be identified to generate the image spike sequence includes: performing spike coding on the key point information to generate a key point spike sequence.

It should be noted that the image to be identified and the spike coding method described above are merely illustrative, and other types of images to be identified and spiking encoding methods can also be used for target identification, which are not limited in the embodiments of the present disclosure.

At operation S93, inputting the image spike sequence into a spiking neural network, and performing target identification on the at least one image to be identified with the spiking neural network.

The target identification on the image to be identified is related to the content shown in the image to be identified. In some embodiments, the image to be identified may include a blurred object or a partially occluded object, and through the above target identification, the object can be accurately identified.

In some embodiments, the image to be identified may include a human body, the target identification may include human behavior identification, and through the target identification, one or more human behaviors may be identified. Exemplarily, the key point spike sequence is input into the preset spiking neural network, and human behavior identification is performed on the image sequence to be identified with the spiking neural network.

It should be noted that the image to be identified and the target identification described above are merely illustrative, and are not limited in the embodiments of the present disclosure.

The spiking neural network is obtained by training in the method for training a spiking neural network according to any of the above embodiments. Performing target identification on the at least one image to be identified with the spiking neural network may further include: identifying a type of the target object, or judging whether the target object belongs to a specific type, or identifying the number of target objects, and the like.

The embodiment of the present disclosure provides a target identification method, which may be configured to perform spike coding on an image to be identified by acquiring the image to be identified, and input the spike coding result into a pre-trained spiking neural network, thereby implementing rapid target identification, improving the identification speed, and ensuring the identification accuracy.

Figure 10:
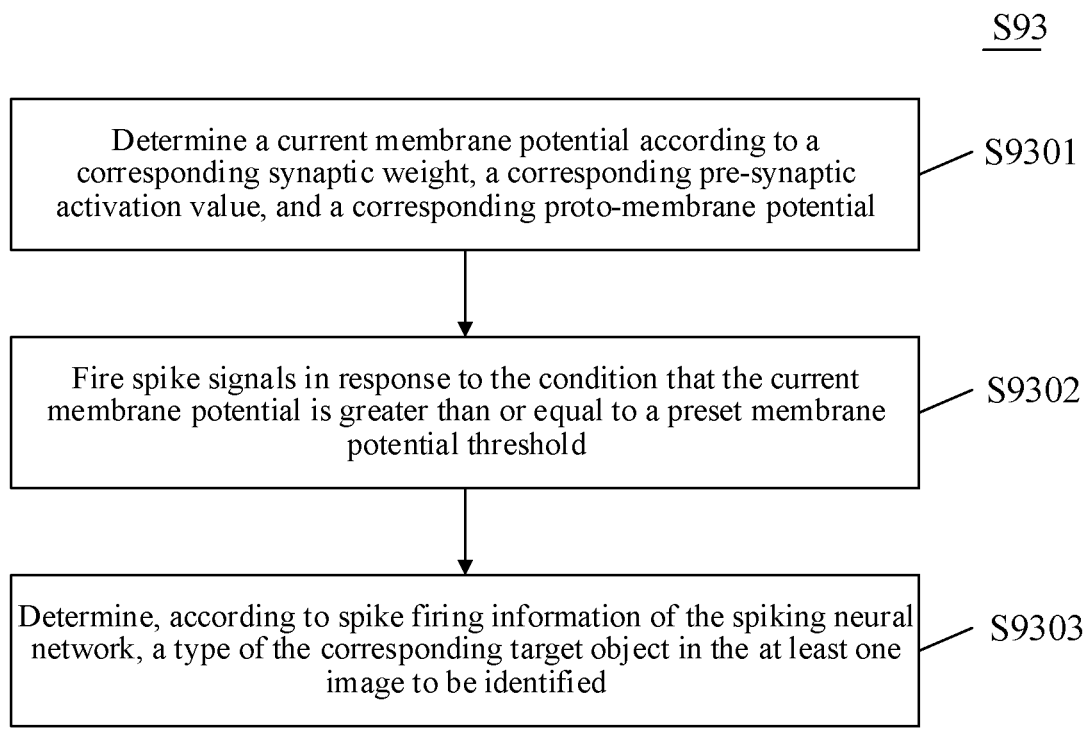
FIG. 10 is a flowchart of a target identification method according to an embodiment of the present disclosure.

FIG. 10 is a flowchart of a target identification method according to an embodiment of the present disclosure, which is intended to further describe an implementation of operation S93. As shown in FIG. 10, exemplarily, a neuron model of the spiking neural network may employ an LIF model. Operation S93 of performing target identification on the at least one image to be identified with the spiking neural network includes: operations S9301 to S9303. Exemplarily, operations S9301 and S9302 correspond to a spike firing process of a single neuron node in the spiking neural network, that is, operations S9301 and S9302 are performed in a single neuron node of the spiking neural network.

At operation S9301, determining a current membrane potential according to a corresponding synaptic weight, a corresponding pre-synaptic activation value, and a corresponding proto-membrane potential.

In a single neuron node of the spiking neural network, the current membrane potential is determined according to a corresponding synaptic weight, a corresponding pre-synaptic activation threshold, and a corresponding proto-membrane potential. Exemplarily, the current membrane potential is determined from a combination of spatial information corresponding to the synaptic weight and the pre-synaptic activation threshold, and temporal information corresponding to the proto-membrane potential.

Exemplarily, in some embodiments, similar to the learning process of model training, in the model application process, for a single neuron node of the spiking neural network, a formula $$I^t = X^{l,t} * W$$

is adopted to carry out synaptic integration and obtain an integrated additional value $I^t$, where l represents a layer identifier; t is a current time step; W represents the corresponding synaptic weight; and $X^{l,t}$ represents an activation value corresponding to a neuron node in layer 1 in the time step t, i.e., the pre-synaptic activation value. The synaptic integration process may be implemented by convolution or full connection or the like.

Further, a formula $$U_m^{l,t} = I^t + V_m^{l,t-1}$$

is adopted to calculate the current membrane potential $U_m^{l,t}$, where $V_m^{l,t-1}$ represents the proto-membrane potential, i.e., the membrane potential corresponding to a previous time step, that is, the relative resting potential.

At operation S9302, firing spike signals in response to a condition that the current membrane potential is greater than or equal to a preset membrane potential threshold.

Exemplarily, in some embodiments, there is a relationship:

$$F^t = U_m^{l,t} \geq V_{th}$$

where $F^t$ represents the fired spike signal; $V_{th}$ represents the membrane potential threshold, where the neuron node fires spike signals if the current membrane potential is greater than or equal to the membrane potential threshold.

In some embodiments, the method further includes, while firing the spike signals: resetting and leaking the membrane potential.

Exemplarily, in some embodiments, a formula $$R_m^t = F^t \cdot V_{reset} + (1 - F^t) \cdot U_m^t$$

is adopted to calculate the membrane potential $R_m^t$, where $V_{reset}$ represents a reset potential.

Further, a formula $$V_m^t = \alpha \cdot R_m^t + \beta$$

is adopted for leaking the membrane potential, where $V_m^{l,t}$ represents a corresponding membrane potential of the neuron node after a response spike is fired, i.e., the leaked membrane potential, which serves as a proto-membrane potential corresponding to a next time step; $\alpha$ is a multiplicative attenuation coefficient, and $\beta$ is an additive attenuation coefficient.

In some embodiments, a formula $$Y^t = f(U_m^t, V_{th})$$

is adopted to determine the actual output $Y^t$ of the neuron node. The actual output is calculated from an analogue activation function f( ) and the current membrane potential. The analogue activation function may be related or independent of the membrane potential threshold, corresponding to a threshold-dependent mode and a threshold-independent mode, respectively.

At operation S9303, determining, according to spike firing information of the spiking neural network, a type of the corresponding target object in the at least one image to be identified.

The spike firing information is obtained from spike signals fired from an output layer of the spiking neural network.

In some embodiments, the response or trigger condition of each neuron node may be determined from the spike firing information, thereby determining the closest type of the target object.

In some embodiments, a confidence degree is accumulated according to the spike firing information, and in response to a case that the confidence is greater than or equal to a preset confidence threshold, it is determined that the type of the target object is a preset type corresponding to the spiking neural network.

In some embodiments, there are a plurality of images to be identified, which form an image sequence to be identified. On this basis and exemplarily, compared with a conventional timing neural network model, such as a recurrent neural network (RNN), a gated recurrent unit (GRU) based neural network, a long short term memory (LSTM) network or the like, the spiking neural network based on the LIF model provided in the present disclosure has the characteristics of fewer parameters, smaller amount of computation and better performance in practical applications, and, in identification of fuzzy targets, moving targets, targets with a small area, targets in a scenario with low visibility, and the like, has better performance in capturing target information, integrating and screening fragment information of different time steps, and the like, based on the image sequence to be identified, as well as an identification accuracy much higher than the former.

In the case of a plurality of images to be identified, after the processing in operations S9301 to S9303, when a target with noisy is identified, a fuzzy target is identified by accumulating information corresponding to the target in multiple time beats at the membrane potential of the neuron node, and firing when the membrane potential is accumulated to the membrane potential threshold. In this method, although there is noise in each beat and a single discrimination is unstable while the information is accumulated, a stable discrimination result can be obtained through comprehensive information accumulation over multiple time beats.

It should be noted that the above description of the spike firing process, the fuzzy target identification process, the corresponding spiking neural network model, and the neuron node is merely an exemplary implementation provided in the embodiment of the present disclosure, and does not limit the technical solution of the present disclosure. Other model construction and operation modes are also applicable to the technical solution of the present disclosure.

The embodiment of the present disclosure provides a target identification method, which may be configured to perform spike coding on an image to be identified by acquiring the image to be identified, and input the spike coding result into a pre-trained spiking neural network, thereby implementing rapid target identification, improving the identification speed and ensuring the identification accuracy. Further, based on the specific neural network model and neuron model, the method has the advantages of higher identification speed and identification accuracy in identification of high-speed targets, fuzzy targets and the like compared with the traditional neural network.

Figure 11:
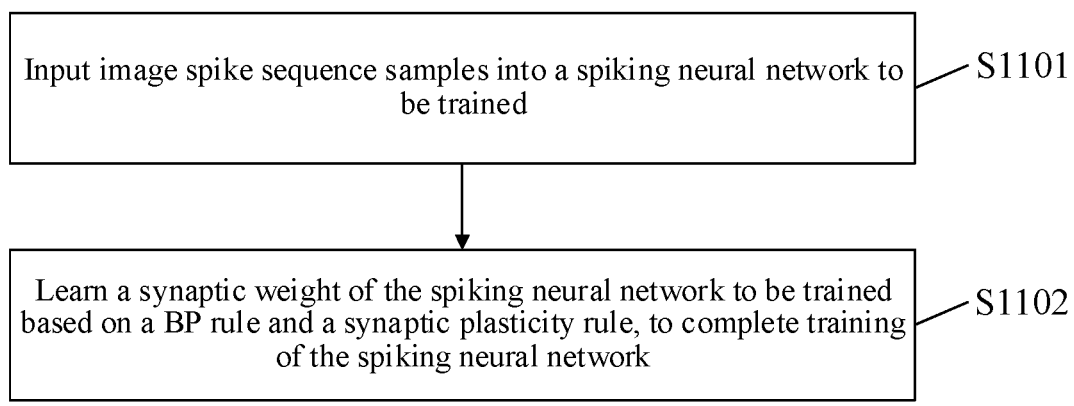
FIG. 11 is a flowchart of a method for training a spiking neural network according to an embodiment of the present disclosure.

FIG. 11 is a flowchart of a method for training a spiking neural network according to an embodiment of the present disclosure, which is configured to train the spiking neural network as described above. As shown in FIG. 11, the method includes the following operations S1101 to S1102.

At operation S1101, inputting image spike sequence samples into a spiking neural network to be trained.

The image spike sequence samples are training samples.

In some embodiments, before inputting spike signals into the spiking neural network to be trained, the method further includes: initializing various parameters, including synaptic weights, activation thresholds, and the like, of the spiking neural network.

In some embodiments, a neuron model of the spiking neural network employs a Leaky Integrate-and-Fire (LIF) model.

At operation S1102, learning a synaptic weight of the spiking neural network to be trained based on a back propagation (BP) rule and a synaptic plasticity rule, to complete training of the spiking neural network.

When training is carried out based on the back propagation rule, the training effect is good, but a great amount of computation is involved in the training, and a large number of marked samples are desired. The synaptic plasticity rule may adopt a bionic training rule such as a spike timing dependent plasticity (STDP) rule or a Hebb learning rule. In some embodiments, the STDP rule includes a long term plasticity (LT) sub-rule, a short term plasticity (STP) sub-rule, a homeostasis sub-rule, and the like. The synaptic plasticity rule is an unsupervised learning method, which adopts a local updating mechanism, involves a small amount of training, and does not need marked samples, but has a limited training effect.

Figure 12:
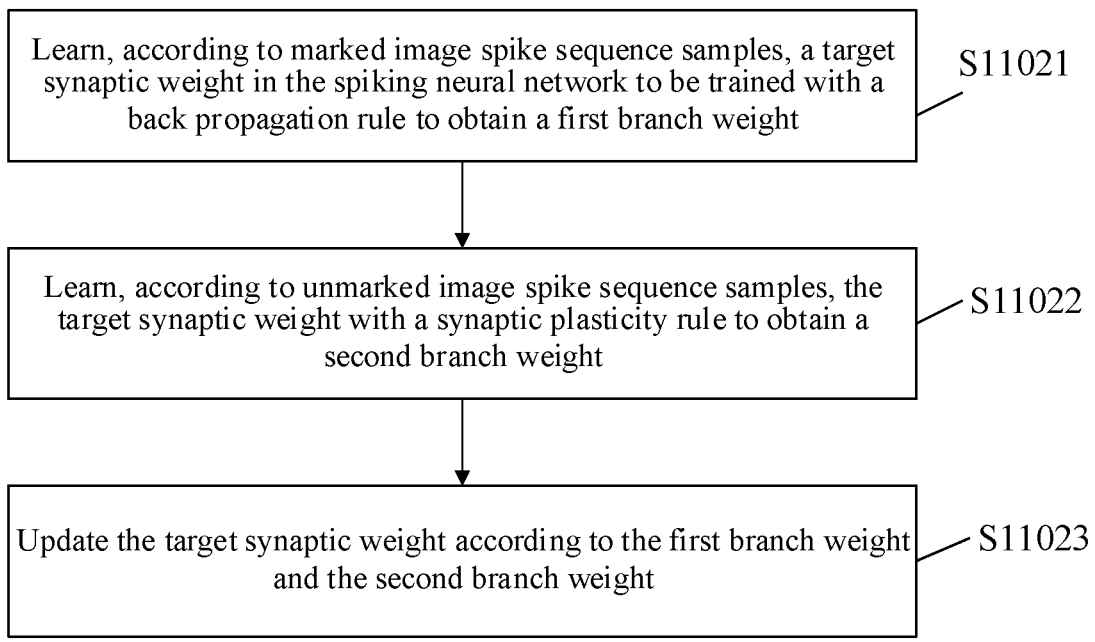
FIG. 12 is a flowchart of a synaptic weight learning method according to an embodiment of the present disclosure.

FIG. 12 is a flowchart of a synaptic weight learning method according to an embodiment of the present disclosure, which is intended to further describe an implementation of operation S1102. As shown in FIG. 12, exemplarily, operation S1102 of learning the synaptic weight of the spiking neural network to be trained based on the back propagation rule and the synaptic plasticity rule includes operations S11021 to S11023.

At operation S11021, learning, according to marked image spike sequence samples, a target synaptic weight in the spiking neural network to be trained with a back propagation rule to obtain a first branch weight.

In operation S11021, the target synaptic weight is updated with the back propagation rule, where the first branch weight is an updated result corresponding to the back propagation rule.

In some embodiments, operation S11021 of learning, according to marked image spike sequence samples, the target synaptic weight in the spiking neural network to be trained with the back propagation rule to obtain the first branch weight includes: obtaining the first branch weight from a forward output result and a back propagation error. In this learning process, taking a single neuron node as an example, the processing may refer to the processing of the corresponding embodiment shown in FIGS. 4a and 4b.

At operation S11022, learning, according to unmarked image spike sequence samples, the target synaptic weight with a synaptic plasticity rule to obtain a second branch weight.

In operation S11022, the target synaptic weight is updated with the synaptic plasticity rule, and the second branch weight is an updated result corresponding to the synaptic plasticity rule.

In some embodiments, operation S11022 of learning, according to unmarked image spike sequence samples, the target synaptic weight with the synaptic plasticity rule to obtain the second branch weight includes: learning the target synaptic weight with a long term plasticity (LT) sub-rule under the synaptic plasticity rule to obtain the second branch weight.

In some embodiments, the long term plasticity sub-rule includes a long term depression (LTD) sub-rule and a long term potentiation (LTP) sub-rule. Therefore, the process of learning the target synaptic weight with the long term plasticity sub-rule under the synaptic plasticity rule includes the following operations.

First, a first weight parameter is obtained according to pre-spiking information and post-spiking information corresponding to the target synaptic weight. The processing in this operation may refer to the processing of operation S3011 in the foregoing embodiment.

Then, a second weight parameter is obtained according to a learning rate and a current value of the target synaptic weight. Considering that the target synaptic weight itself performs iterative update, the second weight parameter is calculated from the learning rate and the current value of the target synaptic weight.

Exemplarily, in some embodiments, based on the additive theory, a formula $$WB_{\pm}(t) = \lambda - \lambda\eta$$

is adopted to calculate the second weight parameter $WB_{\pm}(t)$, where $\lambda$ is the learning rate, and $\eta$ represents a proportionality coefficient between the long term depression sub-rule and the long term potentiation sub-rule.

Thereafter, according to the first weight parameter and the second weight parameter, a third weight parameter corresponding to the long term potentiation sub-rule is determined, and according to the first weight parameter and the second weight parameter, a fourth weight parameter corresponding to the long term depression sub-rule is determined. The processing in this operation may refer to the processing of operation S3013 in the foregoing embodiment.

Finally, the second branch weight is obtained according to the third weight parameter and the fourth weight parameter. The processing in this operation may refer to the processing of operation S3014 in the foregoing embodiment.

It should be noted that the above description of calculating the corresponding weight parameters and weights with the formulas is merely an exemplary implementation provided in the embodiment of the present disclosure, and does not limit the technical solution of the present disclosure. Other calculation methods of obtaining the weights and weight parameters according to corresponding parameters are also applicable to the technical solution of the present disclosure.

In some embodiments, operation S11021 of learning with the back propagation rule and operation S11022 of learning with the synaptic plasticity rule may be performed sequentially or in parallel.

At operation S11023, updating the target synaptic weight according to the first branch weight and the second branch weight.

In some embodiments, each branch weight is subjected to verification and assessment with verification samples to determine an updated value of the target synaptic weight. Alternatively, in some embodiments, the first branch weight and the second branch weight are input into a preset fusion update formula for calculation to obtain the updated value of the target synaptic weight, and the fusion update formula may be designed based on various integration manners such as averaging, summing, weighted averaging and weighted summing.

In some embodiments, operation S11023 of updating the target synaptic weight according to the first branch weight and the second branch weight includes: performing weighted summation on the first branch weight and the second branch weight, and updating the target synaptic weight according to a result of the weighted summation.

Therefore, based on the above training process, the first branch weight is obtained by training with the back propagation rule, the second branch weight is obtained by training with the synaptic plasticity rule, the target synaptic weight is updated according to the first branch weight and the second branch weight, and the target synaptic weight is trained by utilizing the advantages of the back propagation rule and the synaptic plasticity rule, respectively. Therefore, the synaptic weights can be trained and updated quickly with less resource occupation while ensuring the validity of the weight training result, thereby improving training efficiency of the spiking neural network.

Figure 13:
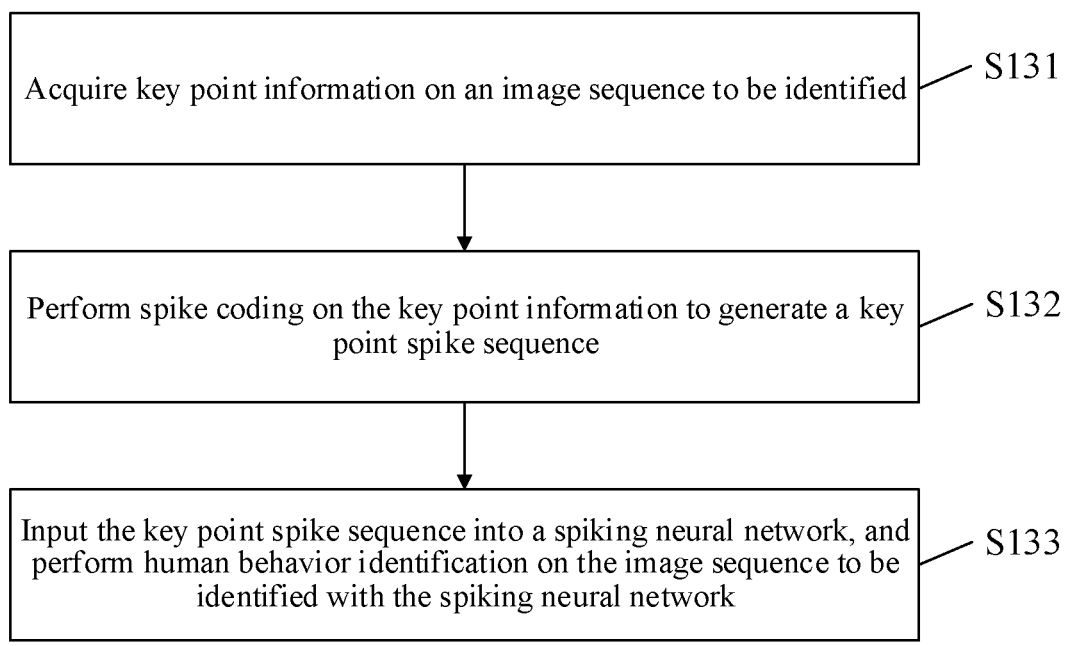
FIG. 13 is a flowchart of a human behavior identification method according to an embodiment of the present disclosure.

FIG. 13 is a flowchart of a human behavior identification method according to an embodiment of the present disclosure, which is configured to identify human behaviors based on a spiking neural network. As shown in FIG. 13, the method includes the following operations S131 to S133.

At operation S131, acquiring key point information on an image sequence to be identified.

The image sequence to be identified includes a plurality of images to be identified, each of which corresponding to a plurality of key points, and the plurality of key points are used for characterizing skeleton features of a human body in the image to be identified, i.e., feature points corresponding to skeleton features. The key point information includes all the acquired key points. In some embodiments, according to an image area occupied by the human body, an image resolution and the like, key points of a same quantity or different quantities are respectively acquired for a same human body in each image to be identified.

In some embodiments, the plurality of key points are determined based on a preset feature point detection algorithm; and in some embodiments, the plurality of key points is determined based on a pre-trained convolutional neural network.

At operation S132, performing spike coding on the key point information to generate a key point spike sequence.

The spiking coding may be implemented by constructing a relationship between a trigger rate of the spike sequence and a pixel intensity of the key points. Alternatively, in some embodiments, the key point may be in a coordinate form, and the coding may be implemented by directly performing binary conversion on a coordinate value of the key point, or by generating a mask matrix based on the coordinates of the key point and the image to be identified, or the like. Alternatively, in some embodiments, the key point spike sequence is generated by group coding, the key point spike sequence is a spatial spike sequence, the key point information corresponding to each image to be identified corresponds to a time step, and the key point spike sequence characterizes variations of the key points over time on a time axis. In some embodiments, the key point spike sequence follows Poisson distribution.

At operation S133, inputting the key point spike sequence into a spiking neural network, and performing human behavior identification on the image sequence to be identified with the spiking neural network.

The spiking neural network is obtained by training with key point spike sequence samples based on a predetermined algorithm in advance. In some embodiments, the spiking neural network is obtained by training in the method for training a spiking neural network according to any of the above embodiments. Performing human behavior identification on the image sequence to be identified with the spiking neural network includes identifying a type of a human behavior, or judging whether the human behavior belongs to a specific type, or identifying the number of different human behaviors, and the like. In some embodiments, the spiking neural network is further constructed based on an attention mechanism, including spatial attention and temporal attention.

Figure 14:
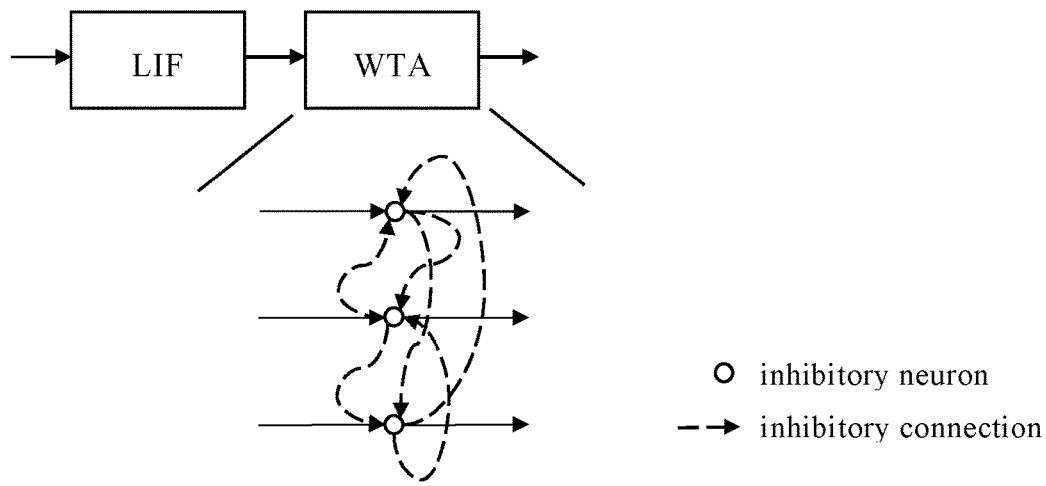
FIG. 14 is a schematic structural diagram of a spiking neural network according to an embodiment of the present disclosure.

FIG. 14 is a schematic structural diagram of a spiking neural network according to an embodiment of the present disclosure. As shown in FIG. 14, each solid arrow in the figure indicates a data transmission direction, each circle indicates an inhibitory neuron corresponding to a winner takes all (WTA) module, and each dashed arrow indicates a relationship of inhibitory connection between inhibitory neurons. A neuron model of the spiking neural network employs an LIF model. Exemplarily, after the complete key point spike sequence is input into the spiking neural network, N spike sequences obtained after the processing by one or more neuron nodes (not shown in the figure) are input into the WTA module, where N=3 is shown in the figure. The module functions to input the N input spike sequences into N corresponding inhibitory neurons, where frequent firing of a single inhibitory neuron will suppress other inhibitory neurons with lower firing frequencies, so that the overall output of the module generally contains merely zero to one frequently fired spike sequence.

It should be noted that the above description of the spiking neural network architecture is merely an exemplary implementation provided in the embodiment of the present disclosure, and does not limit the technical solution of the present disclosure. Other neural network architectures are also applicable to the technical solution of the present disclosure.

The embodiment of the present disclosure provides a human behavior identification method, which may be configured to acquire and code a plurality of key points corresponding to an image to be identified and used for characterizing skeleton features of a human body, and input the coding result into the pre-trained spiking neural network, thereby implementing rapid human behavior identification, improving the identification speed, and ensuring the identification accuracy.

Figure 15:
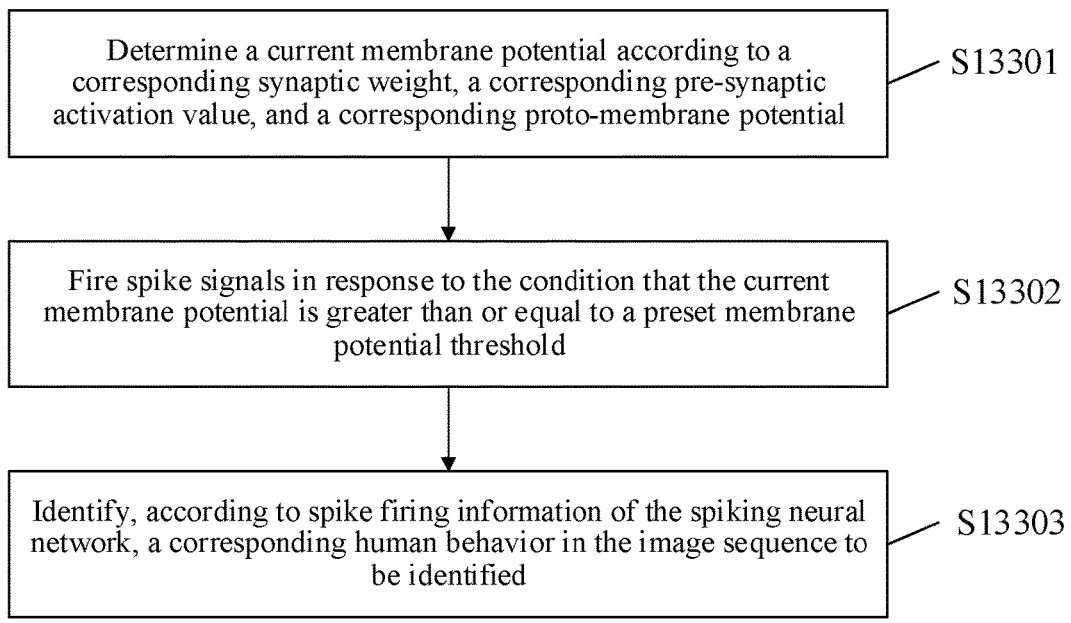
FIG. 15 is a flowchart of a human behavior identification method according to an embodiment of the present disclosure.

FIG. 15 is a flowchart of a human behavior identification method according to an embodiment of the present disclosure, which is intended to further describe an implementation of operation S133. As shown in FIG. 15, exemplarily, a neuron model of the spiking neural network employs an LIF model. Operation S133 of performing human behavior identification on the image sequence to be identified with the spiking neural network includes operations S13301 to S13303. Exemplarily, operations S13301 and S13302 correspond to a spike firing process of a single neuron node in the spiking neural network, that is, operations S13301 and S13302 are performed in a single neuron node of the spiking neural network.

At operation S13301, determining a current membrane potential according to a corresponding synaptic weight, a corresponding pre-synaptic activation value, and a corresponding proto-membrane potential.

It should be noted that the processing in operation S13301 may refer to the processing in operation S9301 as described above.

At operation S13302, firing spike signals in response to a condition that the current membrane potential is greater than or equal to a preset membrane potential threshold.

The processing in operation S13302 may refer to the processing in operation S9302 as described above.

At operation S13303, identifying, according to spike firing information of the spiking neural network, a corresponding human behavior in the image sequence to be identified.

The processing in operation S13303 may refer to the processing in operation S9303 as described above.

The spike firing information is obtained from spike signals fired from an output layer of the spiking neural network. In some embodiments, the response or trigger condition of each neuron node in the output layer may be determined from the spike firing information, thereby determining the closest type of the human behavior. Alternatively, in some embodiments, a confidence degree is accumulated according to the spike firing information, and in response to a case that the confidence is greater than or equal to a preset confidence threshold, it is determined that the type of the human behavior is a preset type corresponding to the spiking neural network.

In some embodiments, the spike firing information is a spatial spike sequence generated after coding, which uses outputs of a plurality of neuron nodes to represent a frame in the spatial spike sequence, and trigger conditions of the neuron nodes correspond to 0 or 1, respectively.

It should be noted that the above description of the spike firing process, the human behavior identification process, the corresponding spiking neural network model, and the neuron node is merely an exemplary implementation provided in the embodiment of the present disclosure, and does not limit the technical solution of the present disclosure. Other model construction and operation modes are also applicable to the technical solution of the present disclosure.

In some embodiments, performing spike coding on the key point information to generate the key point spike sequence includes: first, determining a human body to which a plurality of key points in the key point information belong; and second, performing spike coding on the key points according to the human body to which the key points belong, to generate a plurality of key point spike sequences.

In some optional implementations, a human body to which some of the key points in the key point information belong may be determined, and then, these key points are subjected to spike coding. Further, human bodies to which all the key points in the key point information belong may be further determined, and then, all the key points are subjected to spike coding. It should be noted that whether some or all of the key points are selected for spiking coding, the coding manner is similar, and reference may be made to relevant contents of the embodiments of the present disclosure, which is not described in detail here.

Figure 16:
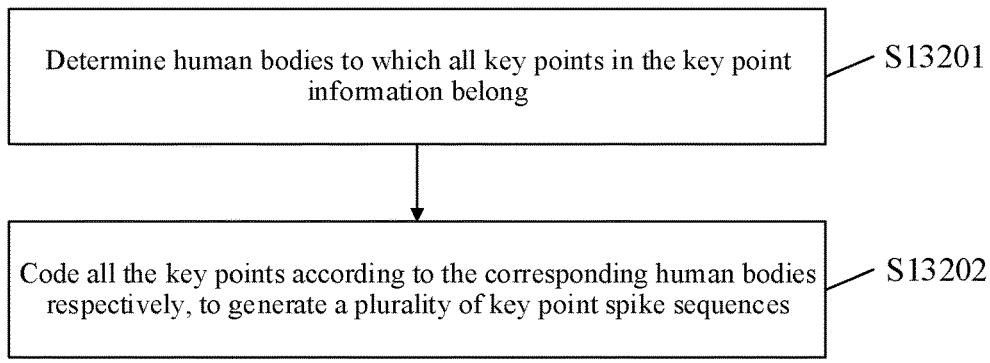
FIG. 16 is a flowchart of an encoding method according to an embodiment of the present disclosure.

FIG. 16 is a flowchart of an encoding method according to an embodiment of the present disclosure, which is intended to further describe an implementation of operation S132. As shown in FIG. 16, exemplarily, a plurality of human bodies are present in the image sequence to be identified. Operation S132 of performing coding on the key point information to generate the key point spike sequence includes operations S13201 to S13202.

At operation S13201, determining human bodies to which all key points in the key point information belong.

In operation S13201, human bodies to which the key points belong are determined and identified.

At operation S13202, coding all the key points according to the corresponding human bodies respectively, to generate a plurality of key point spike sequences.

In operation S13202, a plurality of key point spike sequences corresponding to each of a plurality of human bodies are coded respectively. The plurality of key point spike sequences generated in this process correspond to skeleton features of each of the plurality of human bodies.

Figure 17:
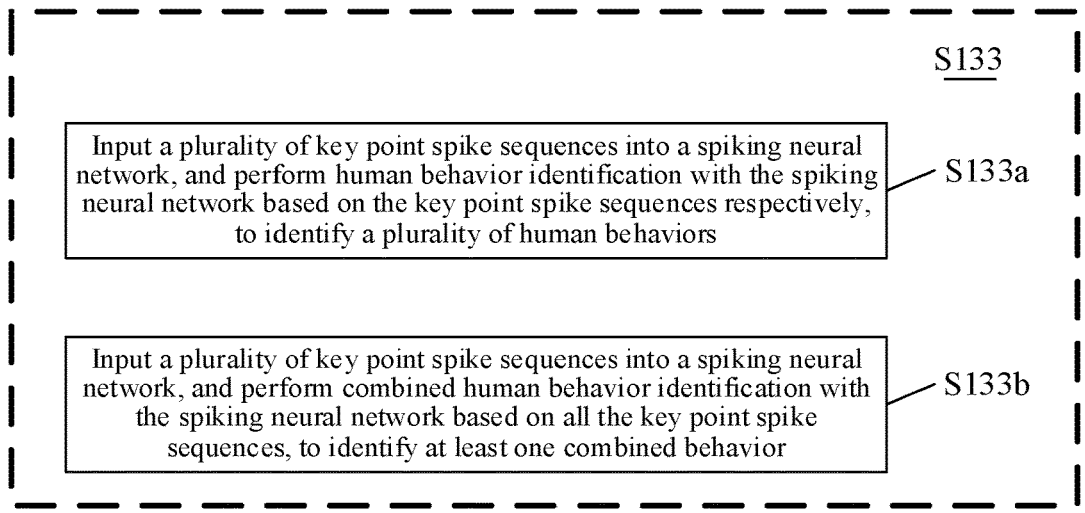
FIG. 17 is a flowchart of a human behavior identification method according to an embodiment of the present disclosure.

FIG. 17 is a flowchart of a human behavior identification method according to an embodiment of the present disclosure, which is intended to further describe an implementation of operation S133. As shown in FIG. 17, exemplarily, on the premise that operation S13201 is implemented, operation S133 of inputting the key point spike sequence into the pre-configured spiking neural network, and performing human behavior identification on the image sequence to be identified with the spiking neural network includes operation S133a.

At operation S133a, inputting a plurality of key point spike sequences into a spiking neural network, and performing human behavior identification with the spiking neural network based on the key point spike sequences respectively, to identify a plurality of human behaviors.

In operation S133a, a plurality of key point spike sequences are input into the spiking neural network, and thereby, human behavior identification is performed based on the key point spike sequences respectively, to output a human behavior identification result for each human body.

In some embodiments, operation S133 of inputting the key point spike sequence into the pre-configured spiking neural network, and performing human behavior identification on the image sequence to be identified with the spiking neural network includes operation S133b.

At operation S133b, inputting a plurality of key point spike sequences into a spiking neural network, and performing combined human behavior identification with the spiking neural network based on all the key point spike sequences, to identify at least one combined behavior.

A single combined behavior corresponds to a plurality of human bodies. In operation S133b, human behavior identification, i.e., combined behavior identification, is performed comprehensively based on the key point spike sequences respectively, to output one or more behavior identification results for a plurality of human bodies as a whole.

It should be noted that operations S133a and S133b may be implemented simultaneously or separately according to the actual task requirements.

The embodiment of the present disclosure provides a human behavior identification method, which may be configured to output respective identification results for a plurality of human bodies or output a comprehensive identification result for a plurality of human bodies through human behavior identification of a plurality of key point spike sequences.

Figure 18:
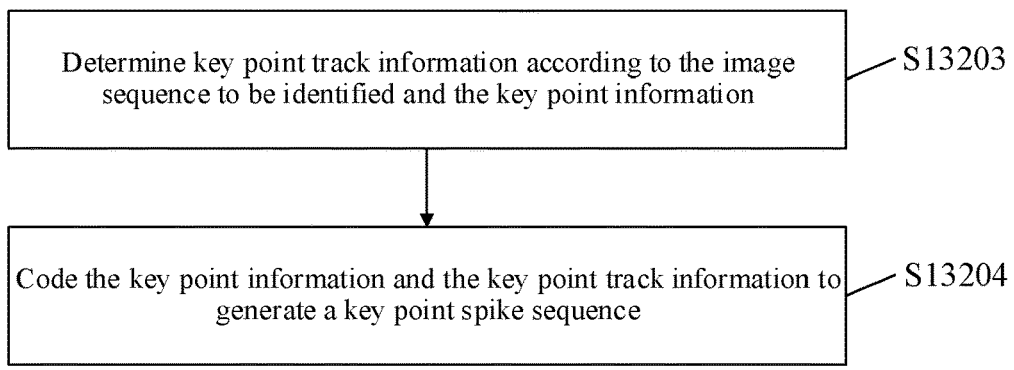
FIG. 18 is a flowchart of an encoding method according to an embodiment of the present disclosure.

FIG. 18 is a flowchart of an encoding method according to an embodiment of the present disclosure, which is intended to further describe an implementation of operation S132. As shown in FIG. 18, exemplarily, operation S132 of performing coding on the key point information to generate the key point spike sequence includes operations S13203 to S13204.

At operation S13203, determining key point track information according to the image sequence to be identified and the key point information.

In some embodiments, the key point track information is generated based on a corresponding algorithm according to time information corresponding to the image sequence to be identified and spatial information corresponding to each key point in different frames.

At operation S13204, coding the key point information and the key point track information to generate the key point spike sequence.

In some embodiments, the human behavior identification method further includes: restoring, in response to missing of a target key point in a frame of the image sequence to be identified, the target key point according to corresponding key point in a previous frame and/or next frame of the frame. Whether a key point is missing in the frame may be determined according to a feature point detection algorithm, or key point track information, or the number of key points corresponding to a previous frame and/or next frame. Moreover, in the image sequence to be identified, the number of images to be identified (number of frames) in which a target key point is missing may be one or more, which is not limited in the embodiments of the present disclosure.

The embodiment of the disclosure provides a human behavior identification method, which may be configured to perform human behavior identification on the image sequence to be identified based on key point information and key point track information, thereby improving the accuracy of human behavior identification while reducing the computation amount.

Figure 19:
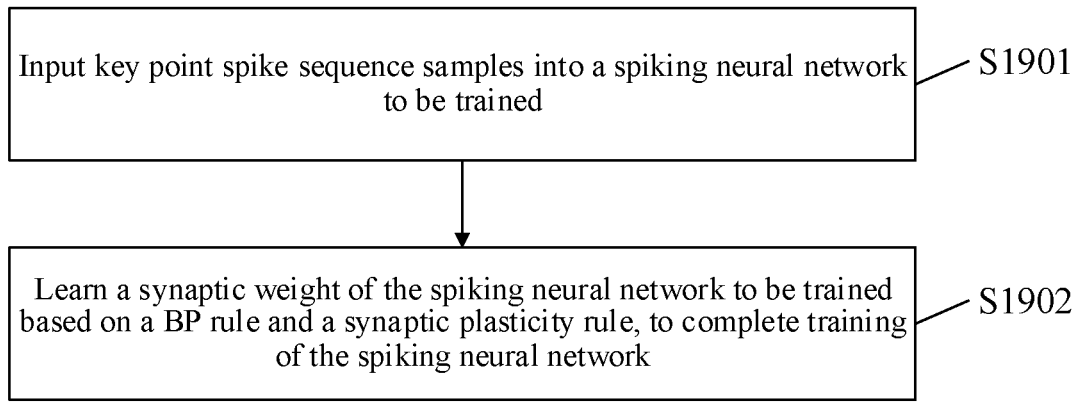
FIG. 19 is a flowchart of a method for training a spiking neural network according to an embodiment of the present disclosure.
Figure 20:
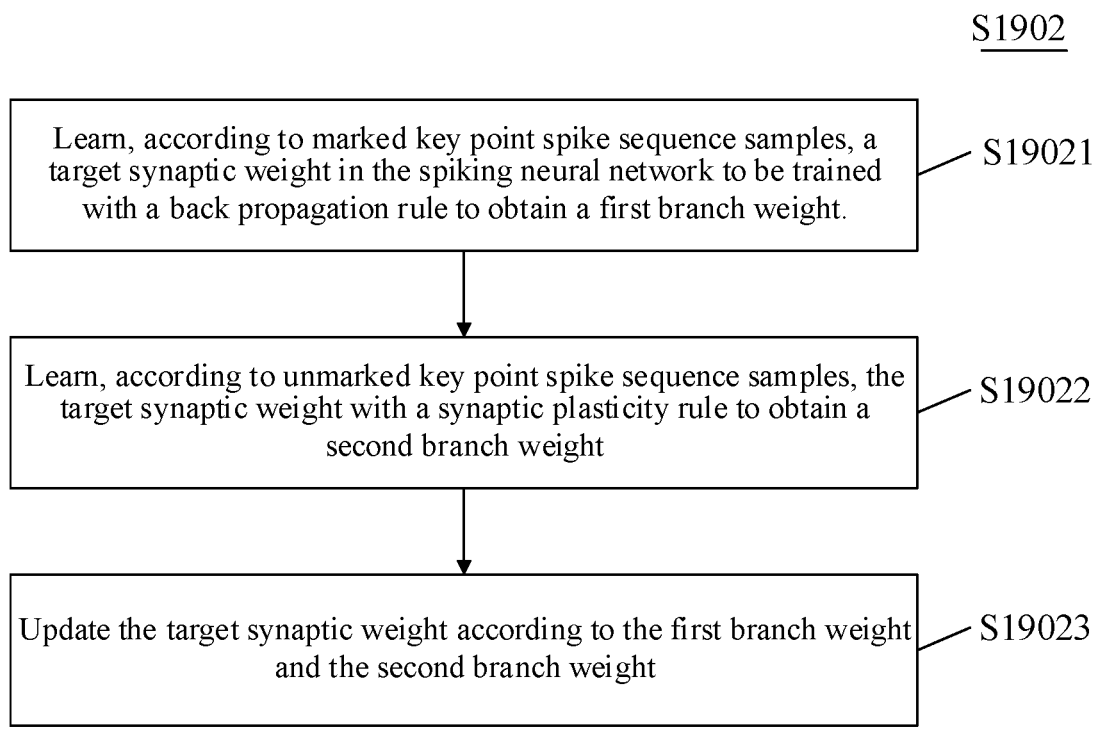
FIG. 20 is a flowchart of a synaptic weight learning method according to an embodiment of the present disclosure.

FIG. 19 is a flowchart of a method for training a spiking neural network according to an embodiment of the present disclosure. As shown in FIG. 19, the method includes the following operations S1901 to S1902.

At operation S1901, inputting key point spike sequence samples into a spiking neural network to be trained.

The key point spike sequence samples are training samples.

The processing in operation S1901 may refer to the processing in operation S1101 as described above.

At operation S1902, learning a synaptic weight of the spiking neural network to be trained based on a back propagation (BP) rule and a synaptic plasticity rule, to complete training of the spiking neural network.

The processing in operation S1902 may refer to the processing in operation S1102 as described above.

At operation S19021, learning, according to marked key point spike sequence samples, a target synaptic weight in the spiking neural network to be trained with a back propagation rule to obtain a first branch weight.

The processing in operation S19021 may refer to the processing in operation S11021 as described above.

At operation S19022, learning, according to unmarked key point spike sequence samples, the target synaptic weight with a synaptic plasticity rule to obtain a second branch weight.

The processing in operation S19022 may refer to the processing in operation S11022 as described above.

At operation S19023, updating the target synaptic weight according to the first branch weight and the second branch weight.

The processing in operation S19023 may refer to the processing in operation S11023 as described above.

Therefore, the first branch weight is obtained by training with the back propagation rule, the second branch weight is obtained by training with the synaptic plasticity rule, the target synaptic weight is updated according to the first branch weight and the second branch weight, and the target synaptic weight is trained by utilizing the advantages of the back propagation rule and the synaptic plasticity rule, respectively. Therefore, the synaptic weights can be trained and updated quickly with less resource occupation while ensuring the validity of the weight training result, thereby improving training efficiency of the spiking neural network.

It should be noted that the method for training the spiking neural network described above is merely illustrative, and relevant contents may refer to any one of the synaptic weight training methods provided in the embodiments of the present disclosure, which are not repeated here.

Figure 21:
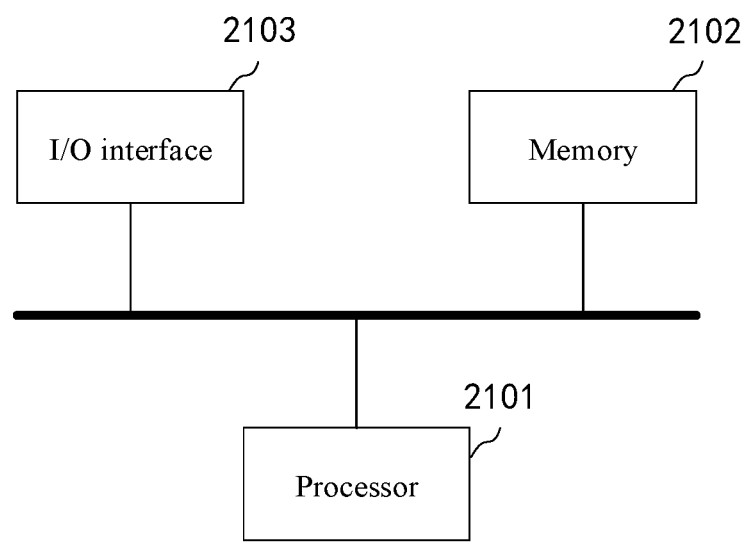
FIG. 21 is a block diagram of an electronic device according to an embodiment of the present disclosure.

FIG. 21 is a block diagram of an electronic device according to an embodiment of the present disclosure.

Referring to FIG. 21, an embodiment of the present disclosure provides an electronic device, including: at least one processor 2101; at least one memory 2102, and one or more I/O interfaces 2103 connected between the processor 2101 and the memory 2102. The memory 2102 has one or more computer programs stored thereon, which may be executed by the at least one processor 2101, where the one or more computer programs, when executed by the at least one processor 2101, cause the at least one processor 2101 to implement the synaptic weight training method or the target identification method described above.

An embodiment of the present disclosure further provides a computer-readable storage medium having a computer program stored thereon.

Figure 22:
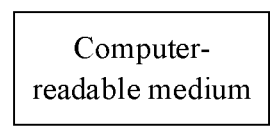
FIG. 22 is a block diagram of a computer-readable storage medium according to an embodiment of the present disclosure.

FIG. 22 is a block diagram of a computer-readable medium according to an embodiment of the present disclosure. The computer program, when executed by a processor/processing core, causes the synaptic weight training method or the target identification method described above to be implemented. The computer-readable storage medium may be a volatile or nonvolatile computer-readable storage medium.

An embodiment of the present disclosure further provides a computer program product including a computer-readable code, or a nonvolatile computer-readable storage medium having a computer-readable code stored thereon, where the computer-readable code, when executed on a processor of an electronic device, causes the processor in the electronic device to perform the synaptic weight training method or the target identification method described above.

Those of ordinary skill in the art will appreciate that all or some operations of the above described method, functional modules/units in the system and apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable storage medium which may include a computer storage medium (or non-transitory medium) or a communication medium (or transitory medium).

As is well known to those of ordinary skill in the art, the term computer storage medium includes volatile and non-volatile, removable and non-removable medium implemented in any method or technology for storing information, such as computer-readable program instructions, data structures, program modules or other data. The computer storage medium includes, but is not limited to, a random access memory (RAM), read-only memory (ROM), an erasable programmable read-only memory (EPROM), a static random access memory (SRAM), a flash memory or any other memory technology, a portable compact disc read-only memory (CD-ROM), a digital versatile disk (DVD) or any other optical disk storage device, a magnetic cassette, a magnetic tape, a magnetic disk storage means or any other magnetic storage device, or any other medium which can be used to store the desired information and accessed by a computer. Moreover, it is well known to those ordinary skilled in the art that a communication medium typically includes computer-readable program instructions, a data structure, a program module, or other data in a modulated data signal, such as a carrier wave or other transport mechanism, and may include any information delivery medium.

The computer-readable program instructions described herein can be downloaded to respective computing/processing devices from a computer-readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer program instructions for carrying out operations of the present disclosure may be assembler instructions, instruction set architecture (ISA) instructions, machine instructions, machine-related instructions, microcodes, firmware instructions, state setting data, or source or object codes written in any combination of one or more programming languages, including an object oriented programming language such as Smalltalk, C++, or the like, and procedural programming languages, such as the "C" programming language or similar programming languages. The computer-readable program instructions may execute entirely on the user computer, partly on the user computer, as a stand-alone software package, partly on the user computer and partly on a remote computer or entirely on the remote computer or server. In the latter scenario, the remote computer may be connected to the user computer through any type of network, including a local area network (LAN) or a wide area network (WAN), or by connecting to an external computer (for example, through the Internet provided by an Internet service provider). In some embodiments, aspects of the present disclosure are implemented by personalizing an electronic circuit, such as a programmable logic circuit, a field programmable gate array (FPGA), or a programmable logic array (PLA), with state information of computer-readable program instructions, which can execute the computer-readable program instructions.

The computer program product described herein may be implemented in hardware, software, or a combination thereof. In an optional embodiment, the computer program product is embodied in a computer storage medium, while in another optional embodiment, the computer program product is embodied in a software product, such as a software development kit (SDK) or the like.

Aspects of the present disclosure are described herein with reference to flowchart illustrations and/or block diagrams of methods, apparatus (systems), and computer programs products according to embodiments of the present disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, when executed via the processor of the computer or other programmable data processing apparatus, create means for implementing the functions/acts specified in flowchart and/or block diagram block or blocks. These computer-readable program instructions may also be stored in a computer-readable storage medium, and direct a computer, a programmable data processing apparatus, and/or other devices to function in a particular manner, such that the computer-readable medium having the instructions stored therein includes an article of manufacture including instructions for implementing aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable data processing apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagram may represent a functional block, a program segment, or a portion of instructions including one or more executable instructions for implementing the specified logical function(s). In some alternative implementations, the functions shown in the blocks may occur out of the order shown in the figures. For example, two blocks shown in succession may, in fact, be executed substantially concurrently, or may sometimes be executed in the reverse order, depending upon the functionality involved. It will also be noted that each block in the block diagram and/or flowchart, and combinations of blocks in the block diagram and/or flowchart, may be implemented by a special purpose hardware-based system which performs the specified functions or acts, or by combinations of special purpose hardware and computer instructions.

The present disclosure has disclosed example embodiments, and although terms are employed, they are used and should be interpreted merely in a generic and descriptive sense, not for purposes of limitation. In some instances, as would be apparent to one skilled in the art, features, characteristics and/or elements described in connection with a particular embodiment may be used alone or in combination with features, characteristics and/or elements described in connection with another embodiment, unless expressly stated otherwise. It will be understood by those skilled in the art that various changes in form and details may be made therein without departing from the scope of the present disclosure as set forth in the appended claims.

What is claimed is:

1. A synaptic weight training method, comprising:
    inputting spike signals corresponding to training samples into a spiking neural network to be trained;
    learning a target synaptic weight in the spiking neural network with a back propagation rule to obtain a first branch weight; and learning the target synaptic weight with a synaptic plasticity rule to obtain a second branch weight; and
    updating the target synaptic weight according to the first branch weight and the second branch weight,
    wherein after learning the target synaptic weight in the spiking neural network with the back propagation rule to obtain the first branch weight, the method further comprises:
    writing the first branch weight into a first branch weight buffer area;
    after learning the target synaptic weight with the synaptic plasticity rule to obtain the second branch weight, the method further comprises:
    writing the second branch weight into a second branch weight buffer area.

2. The method according to claim 1, wherein updating the target synaptic weight according to the first branch weight and the second branch weight comprises:

reading the first branch weight from the first branch weight buffer area, the second branch weight from the second branch weight buffer area, and a current value of the target synaptic weight from a synaptic weight storage area;

updating the target synaptic weight with an adder according to the first branch weight, the second branch weight, and the current value of the target synaptic weight; and outputting the updated target synaptic weight, and writing the updated target synaptic weight into the synaptic weight storage area.

3. The method according to claim 2, wherein reading the first branch weight from the first branch weight buffer area, the second branch weight from the second branch weight buffer area, and the current value of the target synaptic weight from the synaptic weight storage area comprises:

reading, in response to a condition that the first branch weight buffer area and the second branch weight buffer area each have unread branch weights stored therein, the first branch weight from the first branch weight buffer area, the second branch weight from the second branch weight buffer area, and the current value of the target synaptic weight from the synaptic weight storage area.

4. The method according to claim 1, wherein the back propagation rule is a back propagation through time rule;

learning the target synaptic weight in the spiking neural network with the back propagation rule to obtain the first branch weight comprises:

obtaining the first branch weight from a forward output result and a back propagation error.

5. The method according to claim 1, wherein learning the target synaptic weight with the synaptic plasticity rule to obtain the second branch weight comprises:

learning the target synaptic weight with a long term plasticity sub-rule under the synaptic plasticity rule to obtain the second branch weight, wherein the long term plasticity sub-rule comprises: a long term depression sub-rule or a long term potentiation sub-rule;

learning the target synaptic weight with the long term plasticity sub-rule under the synaptic plasticity rule to obtain the second branch weight comprises:

obtaining a first weight parameter according to pre-spiking information and post-spiking information corresponding to the target synaptic weight; and obtaining a second weight parameter according to a learning rate and the current value of the target synaptic weight;

determining, according to the first weight parameter and the second weight parameter, a third weight parameter corresponding to the long term potentiation sub-rule, and determining, according to the first weight parameter and the second weight parameter, a fourth weight parameter corresponding to the long term depression sub-rule; and obtaining the second branch weight according to the third weight parameter and the fourth weight parameter.

6. The method according to claim 1, wherein updating the target synaptic weight according to the first branch weight and the second branch weight comprises:

performing weighted summation on the first branch weight and the second branch weight, and updating the target synaptic weight according to a result of the weighted summation.

7. The method according to claim 6, wherein updating the target synaptic weight according to the first branch weight and the second branch weight further comprises:

adjusting, according to a confidence degree of a supervisory signal corresponding to the target synaptic weight, a first weighting coefficient corresponding to the first branch weight.

8. The method according to claim 6, wherein updating the target synaptic weight according to the first branch weight and the second branch weight further comprises:

adjusting, according to a regulation signal, a second weighting coefficient corresponding to the second branch weight, wherein the regulation signal is determined based on spiking information of a layer in the spiking neural network.

9. A target identification method, comprising:

acquiring at least one image to be identified comprising a target object;

performing spike coding on the at least one image to be identified to generate an image spike sequence;

inputting the image spike sequence into a preset spiking neural network, and performing target identification on the at least one image to be identified with the spiking neural network, wherein the spiking neural network is obtained by training with the synaptic weight training method according to claim 1.

10. The method according to claim 9, wherein the target object comprises a human body, the image to be identified comprises key point information, comprising at least one key point, a plurality of key points are used for characterizing skeleton features of the human body in the image to be identified, and the image spike sequence comprises a key point spike sequence;

performing spike coding on the at least one image to be identified to generate the image spike sequence comprises:

performing spike coding on the key point information to generate the key point spike sequence, and inputting the image spike sequence into the preset spiking neural network, and performing target identification on the at least one image to be identified with the spiking neural network comprises:

inputting the key point spike sequence into the preset spiking neural network, and performing human behavior identification on the image sequence to be identified with the spiking neural network.

11. The method according to claim 10, wherein a plurality of human bodies are present in the image to be identified; and performing spike coding on the key point information to generate the key point spike sequence comprises:

determining a human body to which a plurality of key points in the key point information belong; and performing spike coding on the key points according to the human body to which the key points belong, to generate a plurality of key point spike sequences.

12. The method according to claim 10, wherein performing spike coding on the key point information to generate the key point spike sequence comprises:

determining key point track information according to the image to be identified and the key point information; and coding the key point information and the key point track information to generate the key point spike sequence.

13. The method according to claim 10, wherein inputting the key point spike sequence into the preset spiking neural network, and performing human behavior identification on the image sequence to be identified with the spiking neural network comprises:

inputting a plurality of key point spike sequences into the spiking neural network, and performing human behavior identification with the spiking neural network based on the key point spike sequences respectively, to identify a plurality of human behaviors;

or, inputting a plurality of key point spike sequences into the spiking neural network, and performing combined human behavior identification with the spiking neural network based on the plurality of key point spike sequences, to identify at least one combined behavior, wherein a single combined behavior corresponds to a plurality of human bodies.

14. The method according to claim 9, wherein performing target identification on the at least one image to be identified with the spiking neural network comprises:

determining, in a single neuron node of the spiking neural network, a current membrane potential according to a corresponding synaptic weight, a corresponding pre-synaptic activation value, and a corresponding proto-membrane potential;

firing spike signals in response to the condition that the current membrane potential is greater than or equal to a preset membrane potential threshold; and determining, according to spike firing information of the spiking neural network, a type of the corresponding target object in the at least one image to be identified, wherein the spike firing information is obtained from spike signals fired from an output layer of the spiking neural network.

15. The method according to claim 14, wherein determining, according to the spike firing information of the spiking neural network, the type of the corresponding target object in the at least one image to be identified comprises:

accumulating a confidence degree according to the spike firing information, and determining in response to a case that the confidence degree is greater than or equal to a preset confidence threshold, that the type of the target object is a preset type.

16. An electronic device, comprising a memory, a processor, and a computer program stored in the memory and executable on the processor, wherein the processor, when executing the computer program, implements the synaptic weight training method according to claim 1.

17. A non-transitory computer-readable storage medium having a computer program stored thereon, wherein the computer program, when executed by a processor, causes the synaptic weight training method according to claim 1.

18. An electronic device, comprising a memory, a processor, and a computer program stored in the memory and executable on the processor, wherein the processor, when executing the computer program, implements the target identification method according to claim 9.

19. A non-transitory computer-readable storage medium having a computer program stored thereon, wherein the computer program, when executed by a processor, causes the target identification method according to claim 9 to be implemented.

* * * * *